US009580788B2

(12) United States Patent
Luce et al.

(10) Patent No.: US 9,580,788 B2
(45) **Date of Patent: *Feb. 28, 2017**

(54) METHODS FOR AUTOMATED DEPOSITION OF HARDFACING MATERIAL ON EARTH-BORING TOOLS AND RELATED SYSTEMS

(71) Applicant: Baker Hughes Incorporated, Houston, TX (US)

(72) Inventors: David Keith Luce, Splendora, TX (US); Alan J. Massey, Houston, TX (US); Kenneth E. Gilmore, Cleveland, TX (US); Timothy P. Uno, Spring, TX (US); Keith L. Nehring, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,492

(22) Filed: Feb. 3, 2015

(65) Prior Publication Data

US 2015/0167143 A1 Jun. 18, 2015

Related U.S. Application Data

(60) Continuation of application No. 13/903,310, filed on May 28, 2013, now Pat. No. 8,969,754, which is a (Continued)

(51) Int. Cl.
*B23K 10/00* (2006.01)
*C23C 4/12* (2016.01)

(Continued)

(52) U.S. Cl.
CPC .............. *C23C 4/127* (2013.01); *B05B 7/222* (2013.01); *B24D 3/34* (2013.01); *B24D 18/00* (2013.01);

(Continued)

(58) Field of Classification Search
CPC .......... H05H 1/26; C23C 4/127; B05B 7/222; E21B 17/1085; B24D 3/34; B24D 18/00

(Continued)

(56) References Cited

U.S. PATENT DOCUMENTS 930,759 A 6/1909 Hughes
1,874,066 A 8/1932 Scott et al.

(Continued)

FOREIGN PATENT DOCUMENTS

CA 2458158 C 4/2007
EP 049899 4/1982

(Continued)

OTHER PUBLICATIONS

"EZCase Casing Bit System," © 2007 Baker Hughes Incorporated, www.HCCbits.com, 2 pages.

(Continued)

*Primary Examiner* — Mark Paschall
(74) *Attorney, Agent, or Firm* — TraskBritt

(57) ABSTRACT

Methods of depositing hardfacing material portions of earth-boring tools may involve supporting at least a portion of an earth-boring tool in a holder of a workpiece positioner, the holder being movable in at least a third plane. A location of a surface of the at least a portion of the earth-boring tool may be determined utilizing at least one sensor. The workpiece positioner, the sensor, and a torch positioner comprising a hardfacing torch movable in at least a first plane perpendicular to the third plane and a second plane parallel to the third plane may be controlled utilizing a programmable control system to cause the torch positioner to oscillate the hardfacing torch in the second plane while selectively causing the workpiece positioner to move the holder in the third plane and causing the torch to deposit hardfacing material on the surface.

20 Claims, 24 Drawing Sheets

Related U.S. Application Data division of application No. 12/257,219, filed on Oct. 23, 2008, now Pat. No. 8,450,637.

(51) Int. Cl.
*B05B 7/22* (2006.01)
*E21B 17/10* (2006.01)
*B24D 3/34* (2006.01)
*B24D 18/00* (2006.01)

(52) U.S. Cl.
CPC .......... *C23C 4/134* (2016.01); *E21B 17/1085* (2013.01)

(58) Field of Classification Search
USPC ... 219/121.39, 121.45, 121.59, 76.15, 76.16, 219/121.47, 121.58, 121.54
See application file for complete search history.

(56) References Cited

U.S. PATENT DOCUMENTS 1,879,127 A 9/1932 Schlumpf
1,932,487 A 10/1933 Scott
2,030,722 A 2/1936 Scott
2,198,849 A 4/1940 Waxler
2,297,157 A 9/1942 MCMcClinton
2,719,026 A 9/1955 Boice
3,010,708 A 11/1961 Hlinsky et al.
3,055,443 A 9/1962 Edwards
3,174,564 A 3/1965 Morlan
3,269,469 A 8/1966 Kelly, Jr.
3,424,258 A 1/1969 Nakayama
3,777,115 A * 12/1973 Kazlauskas .............. B23K 9/30 219/124.03
3,865,525 A 2/1975 Dunn
RE28,625 E 11/1975 Cunningham
4,006,788 A 2/1977 Garner
4,104,505 A * 8/1978 Rayment ................. B05B 7/226 219/121.47
4,140,189 A 2/1979 Garner
4,162,389 A 7/1979 Shimdada et al.
4,182,394 A 1/1980 Cason
4,190,126 A 2/1980 Kabashima
4,228,339 A 10/1980 Scales et al.
4,243,727 A 1/1981 Wisler et al.
4,270,812 A 6/1981 Thomas
4,285,409 A 8/1981 Allen
4,293,048 A 10/1981 Kloesel
4,309,587 A 1/1982 Nakano et al.
4,320,808 A 3/1982 Garrett
4,343,371 A 8/1982 Baker et al.
4,358,471 A 11/1982 Derkacs et al.
4,359,112 A 11/1982 Garner et al.
4,369,849 A 1/1983 Parrish
4,373,128 A 2/1983 Asai et al.
4,380,695 A 4/1983 Nelson
4,396,077 A 8/1983 Radtke
4,410,284 A 10/1983 Herrick
4,411,935 A 10/1983 Anderson
4,444,281 A 4/1984 Schumacher et al.
4,527,637 A 7/1985 Bodine
4,546,902 A 10/1985 Anderson
4,567,343 A 1/1986 Sullivan
4,572,306 A 2/1986 Dorosz
4,598,778 A 7/1986 Highsmith
4,664,705 A 5/1987 Horton et al.
4,689,463 A 8/1987 Shubert
4,690,228 A 9/1987 Voelz et al.
4,726,718 A 2/1988 Meskin et al.
4,727,942 A 3/1988 Galle et al.
4,738,322 A 4/1988 Hall et al.
4,763,736 A 8/1988 Varel
4,765,205 A 8/1988 Higdon
4,814,234 A 3/1989 Bird
4,835,357 A 5/1989 Schalk
4,836,307 A 6/1989 Keshavan et al.
4,864,094 A 9/1989 Saltzman et al.
4,866,241 A 9/1989 Doherty et al.
4,874,047 A 10/1989 Hixon
4,875,532 A 10/1989 Langford
4,892,159 A 1/1990 Holster
4,923,511 A 5/1990 Krizan
4,932,484 A 6/1990 Warren et al.
4,936,398 A 6/1990 Auty
4,943,488 A 7/1990 Sung et al.
4,953,641 A 9/1990 Pessier
4,984,643 A 1/1991 Isbell et al.
4,991,671 A 2/1991 Pearce et al.
5,010,225 A 4/1991 Carlin
5,016,718 A 5/1991 Tandberg
5,027,912 A 7/1991 Juergens
5,028,177 A 7/1991 Meskin et al.
5,030,276 A 7/1991 Sung et al.
5,038,640 A 8/1991 Sullivan et al.
5,049,164 A 9/1991 Horton et al.
5,116,568 A 5/1992 Sung et al.
5,145,017 A 9/1992 Holster et al.
5,152,194 A 10/1992 Keshavan et al.
5,176,212 A 1/1993 Tandberg
5,224,560 A 7/1993 Fernandez
5,226,977 A 7/1993 Kitaguchi et al.
5,233,150 A * 8/1993 Schneebeli ............ B23K 9/044 219/125.1
5,238,074 A 8/1993 Tibbitts
5,254,923 A 10/1993 Kanitani
5,287,936 A 2/1994 Grimes
5,289,889 A 3/1994 Gearhart et al.
5,293,026 A 3/1994 Dennis et al.
5,314,722 A 5/1994 Kobayashi
5,337,843 A 8/1994 Torgrimsen et al.
5,346,026 A 9/1994 Pessier et al.
5,429,200 A 7/1995 Blackman et al.
5,439,068 A 8/1995 Huffstutler et al.
5,452,771 A 9/1995 Blackman et al.
5,467,836 A 11/1995 Grimes et al.
5,513,715 A 5/1996 Dysart
5,518,077 A 5/1996 Blackman et al.
5,524,510 A 6/1996 Davies et al.
5,535,838 A 7/1996 Keshavan et al.
5,547,033 A 8/1996 Campos
5,553,681 A 9/1996 Huffstutler et al.
5,558,170 A 9/1996 Thigpen et al.
5,570,750 A 11/1996 Williams
5,593,231 A 1/1997 Ippolito
5,606,895 A 3/1997 Huffstutler
5,624,002 A 4/1997 Huffstutler
5,624,588 A 4/1997 Terawaki et al.
5,641,029 A 6/1997 Beaton et al.
5,644,956 A 7/1997 Blackman et al.
5,645,896 A 7/1997 Mills
5,655,612 A 8/1997 Grimes et al.
D384,084 S 9/1997 Huffstutler et al.
5,695,018 A 12/1997 Pessier
5,695,019 A 12/1997 Shamburger
5,710,405 A 1/1998 Solomon et al.
5,740,872 A 4/1998 Smith
5,755,297 A 5/1998 Young et al.
5,755,298 A 5/1998 Langford et al.
5,755,299 A 5/1998 Langford et al.
5,853,815 A 12/1998 Muehlberger
5,866,872 A 2/1999 Lu et al.
5,868,502 A 2/1999 Cariveau et al.
5,873,422 A 2/1999 Hansen et al.
5,893,204 A 4/1999 Symonds
5,900,272 A 5/1999 Goodman
5,921,330 A 7/1999 Sue et al.
5,935,350 A 8/1999 Raghu et al.
5,941,322 A 8/1999 Stephenson et al.
5,942,289 A 8/1999 Jackson
5,944,125 A 8/1999 Byrd
5,967,246 A 10/1999 Caraway et al.
5,979,576 A 11/1999 Hansen et al.
5,988,303 A 11/1999 Arfele
5,992,542 A 11/1999 Rives

(56) References Cited

U.S. PATENT DOCUMENTS

| | | | |
|---|---|---|---|
| 5,996,713 A | 12/1999 | Pessier et al. | |
| 6,023,044 A | 2/2000 | Kosaka et al. | |
| 6,046,431 A | 4/2000 | Beattie | |
| 6,084,196 A | 7/2000 | Flowers et al. | |
| 6,092,613 A | 7/2000 | Caraway et al. | |
| 6,095,265 A | 8/2000 | Alsup | |
| 6,109,375 A | 8/2000 | Tso | |
| 6,124,564 A | 9/2000 | Sue et al. | |
| 6,138,779 A | 10/2000 | Boyce | |
| 6,173,797 B1 | 1/2001 | Dykstra et al. | |
| 6,214,420 B1 | 4/2001 | Girardin et al. | |
| 6,220,374 B1 | 4/2001 | Crawford | |
| 6,260,635 B1 | 7/2001 | Crawford | |
| 6,279,671 B1 | 8/2001 | Panigrahi et al. | |
| 6,283,233 B1 | 9/2001 | Lamine et al. | |
| 6,296,069 B1 | 10/2001 | Lamine et al. | |
| RE37,450 E | 11/2001 | Deken | |
| 6,360,831 B1 | 3/2002 | Akesson et al. | |
| 6,375,895 B1 | 4/2002 | Daemen | |
| 6,376,801 B1 | 4/2002 | Farrell et al. | |
| 6,380,512 B1 | 4/2002 | Emer | |
| 6,386,302 B1 | 5/2002 | Beaton | |
| 6,392,190 B1 * | 5/2002 | Sue | B23K 9/287 175/327 |
| 6,401,844 B1 | 6/2002 | Doster | |
| 6,408,958 B1 | 6/2002 | Isbell et al. | |
| 6,415,687 B2 | 7/2002 | Saxman | |
| 6,439,326 B1 | 8/2002 | Huang et al. | |
| 6,446,739 B1 | 9/2002 | Richman et al. | |
| 6,450,270 B1 | 9/2002 | Saxton | |
| 6,474,424 B1 | 11/2002 | Saxman | |
| 6,510,906 B1 | 1/2003 | Richert et al. | |
| 6,510,909 B2 | 1/2003 | Portwood et al. | |
| 6,527,066 B1 | 3/2003 | Rives | |
| 6,533,051 B1 | 3/2003 | Singh et al. | |
| 6,544,308 B2 | 4/2003 | Griffin et al. | |
| 6,562,462 B2 | 5/2003 | Griffin et al. | |
| 6,568,490 B1 | 5/2003 | Tso et al. | |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,475 B2 | 8/2003 | Davies et al. | |
| 6,601,661 B2 | 8/2003 | Baker et al. | |
| 6,601,662 B2 | 8/2003 | Matthias et al. | |
| 6,615,936 B1 | 9/2003 | Mourik et al. | |
| 6,649,682 B1 | 11/2003 | Breton et al. | |
| 6,684,967 B2 | 2/2004 | Mensa-Wilmot et al. | |
| 6,698,098 B2 | 3/2004 | Griffo et al. | |
| 6,729,418 B2 | 5/2004 | Slaughter, Jr. et al. | |
| 6,739,214 B2 | 5/2004 | Griffin et al. | |
| 6,742,607 B2 | 6/2004 | Beaton | |
| 6,749,033 B2 | 6/2004 | Griffin et al. | |
| 6,766,870 B2 | 7/2004 | Overstreet | |
| 6,772,849 B2 | 8/2004 | Oldham et al. | |
| 6,797,326 B2 | 9/2004 | Griffin et al. | |
| 6,843,333 B2 | 1/2005 | Richert et al. | |
| 6,861,098 B2 | 3/2005 | Griffin | |
| 6,861,137 B2 | 3/2005 | Griffin | |
| 6,861,612 B2 | 3/2005 | Bolton | |
| 6,878,447 B2 | 4/2005 | Griffin | |
| 6,883,623 B2 | 4/2005 | McCormick et al. | |
| 6,972,390 B2 | 12/2005 | Hu et al. | |
| 6,986,395 B2 | 1/2006 | Chen | |
| 6,988,569 B2 | 1/2006 | Lockstedt et al. | |
| 7,034,262 B2 | 4/2006 | Fischer et al. | |
| 7,041,936 B2 | 5/2006 | Oberzaucher et al. | |
| 7,049,540 B2 | 5/2006 | Sanders et al. | |
| 7,096,978 B2 | 8/2006 | Dykstra et al. | |
| 7,111,694 B2 | 9/2006 | Beaton | |
| 7,137,460 B2 | 11/2006 | Slaughter, Jr. et al. | |
| 7,152,702 B1 | 12/2006 | Bhome et al. | |
| 7,210,377 B2 | 5/2007 | Griffo et al. | |
| 7,234,550 B2 | 6/2007 | Azar et al. | |
| 7,262,240 B1 | 8/2007 | Breton et al. | |
| 7,350,568 B2 | 4/2008 | Mandal et al. | |
| 7,350,601 B2 | 4/2008 | Belnap et al. | |
| 7,360,612 B2 | 4/2008 | Chen et al. | |
| 7,361,411 B2 | 4/2008 | Daemen et al. | |
| 7,377,341 B2 | 5/2008 | Middlemiss et al. | |
| 7,387,177 B2 | 6/2008 | Zahradnik et al. | |
| 7,392,862 B2 | 7/2008 | Zahradnik et al. | |
| 7,398,837 B2 | 7/2008 | Hall et al. | |
| 7,416,036 B2 | 8/2008 | Forstner et al. | |
| 7,435,478 B2 | 10/2008 | Keshavan | |
| 7,462,003 B2 | 12/2008 | Middlemiss | |
| 7,473,287 B2 | 1/2009 | Belnap et al. | |
| 7,493,973 B2 | 2/2009 | Keshavan et al. | |
| 7,517,589 B2 | 4/2009 | Eyre | |
| 7,533,740 B2 | 5/2009 | Zhang et al. | |
| 7,568,534 B2 | 8/2009 | Griffin et al. | |
| 8,471,182 B2 | 6/2013 | Stauffer et al. | |
| 8,698,038 B2 * | 4/2014 | Luce | B23K 9/044 175/327 |
| 2002/0017402 A1 | 2/2002 | Bird | |
| 2004/0108145 A1 | 6/2004 | Siracki | |
| 2004/0173384 A1 | 9/2004 | Yong et al. | |
| 2005/0077090 A1 | 4/2005 | Viswanadham et al. | |
| 2005/0087370 A1 | 4/2005 | Ledgerwood, III et al. | |
| 2005/0178587 A1 | 8/2005 | Witman et al. | |
| 2005/0183892 A1 | 8/2005 | Oldham et al. | |
| 2005/0263328 A1 | 12/2005 | Middlemiss | |
| 2005/0273301 A1 | 12/2005 | Huang | |
| 2006/0032674 A1 | 2/2006 | Chen et al. | |
| 2006/0032677 A1 | 2/2006 | Azar et al. | |
| 2006/0162969 A1 | 7/2006 | Belnap et al. | |
| 2006/0177689 A1 | 8/2006 | Muir et al. | |
| 2006/0196699 A1 | 9/2006 | Estes et al. | |
| 2006/0213693 A1 | 9/2006 | Zahradnik et al. | |
| 2006/0254830 A1 | 11/2006 | Radtke | |
| 2006/0266558 A1 | 11/2006 | Middlemiss et al. | |
| 2006/0266559 A1 | 11/2006 | Keshavan et al. | |
| 2006/0278442 A1 | 12/2006 | Kristensen | |
| 2006/0283640 A1 | 12/2006 | Estes et al. | |
| 2007/0000698 A1 | 1/2007 | Viswanadham | |
| 2007/0029114 A1 | 2/2007 | Middlemiss | |
| 2007/0032905 A1 | 2/2007 | Nagatsuka et al. | |
| 2007/0062736 A1 | 3/2007 | Cariveau et al. | |
| 2007/0079994 A1 | 4/2007 | Middlemiss | |
| 2007/0187155 A1 | 8/2007 | Middlemiss | |
| 2007/0243794 A1 | 10/2007 | Mundt | |
| 2008/0066970 A1 | 3/2008 | Zahradnik et al. | |
| 2008/0145686 A1 | 6/2008 | Mirchandani et al. | |
| 2008/0181366 A1 | 7/2008 | Bamola | |
| 2008/0264695 A1 | 10/2008 | Zahradnik et al. | |
| 2008/0296068 A1 | 12/2008 | Zahradnik et al. | |
| 2009/0032310 A1 | 2/2009 | Stevens et al. | |
| 2009/0039062 A1 | 2/2009 | Cretegny et al. | |
| 2009/0114454 A1 | 5/2009 | Belnap et al. | |
| 2009/0126998 A1 | 5/2009 | Zahradnik et al. | |
| 2009/0159338 A1 | 6/2009 | Buske | |
| 2009/0159341 A1 | 6/2009 | Pessier et al. | |
| 2009/0166093 A1 | 7/2009 | Pessier et al. | |
| 2009/0178855 A1 | 7/2009 | Zhang et al. | |
| 2009/0183925 A1 | 7/2009 | Zhang et al. | |
| 2010/0065337 A1 | 3/2010 | Luce et al. | |
| 2010/0078224 A1 | 4/2010 | Steel et al. | |
| 2010/0104736 A1 | 4/2010 | Luce et al. | |
| 2010/0106285 A1 | 4/2010 | Massey | |
| 2010/0159157 A1 | 6/2010 | Stevens et al. | |
| 2010/0181292 A1 | 7/2010 | Stauffer et al. | |
| 2013/0273258 A1 | 10/2013 | Luce et al. | |

FOREIGN PATENT DOCUMENTS

| | | |
|---|---|---|
| EP | 194050 A1 | 9/1986 |
| EP | 225101 | 6/1987 |
| EP | 157278 | 11/1989 |
| EP | 351039 | 1/1990 |
| EP | 496181 A1 | 7/1992 |
| EP | 496181 A2 | 7/1992 |
| EP | 573135 A1 | 12/1993 |
| EP | 391683 | 1/1996 |
| EP | 2089187 A1 | 8/2009 |
| GB | 1323672 A | 7/1973 |

(56) References Cited

FOREIGN PATENT DOCUMENTS

| | | | |
|---|---|---|---|
| GB | 2183694 | A | 6/1987 |
| GB | 2276886 | A | 10/1994 |
| GB | 2293615 | A | 4/1996 |
| GB | 2295157 | A | 5/1996 |
| GB | 2311085 | A | 9/1997 |
| JP | 05131289 | A | 5/1993 |
| JP | 08141744 | A | 6/1996 |
| JP | 2005524533 | A | 8/2005 |
| WO | 8502223 | A1 | 5/1985 |
| WO | 9706339 | A1 | 2/1997 |
| WO | 2008124572 | A1 | 10/2008 |
| WO | 2009043369 | A1 | 4/2009 |

OTHER PUBLICATIONS

"EZReam Casing/Liner Shoe," © 2007 Baker Hughes Incorporated, www.HCCbits.com, 2 pages.

"GaugePro XPR Expandable Reamer," © 2008 Baker Hughes Incorporated, www.HCCbits.com, 2 pages.

Berge, James M., "Automating the Welding Process, Successful Implementation of Automated Welding Systems," Copyright 1994 by Industrial Press Inc., New York, NY.

Buske et al., Performance Pardigm Shift: Drilling Vertical and directional Sections Through Abrasive Formations with Roller Cone Bits, Society of Petroleum Engineers—ISPE 114975, CIPC/SPE Gas Technology Symposium 2008 Joint Conference, Canada, Jun. 16-19, 2008.

Cary, Howard B., "Arc Welding Automation," Copyright 1995 by Marcel Dekker, Inc., New York, NY , Chapters 1-20 and Appendixes. (submitted in 3 parts).

Creating E&P. Value, inDepth TM, vol. 10, No. 1, 2004, © 2004 Baker Hughes Incorporated, pp. 6-60.

Ersoy et al., Wear Characteristics of PDC Pin and Hybrid Core Bits in Rock Drilling, Wear 188, Elsevier Science S.A., Mar. 1995, pp. 150-165.

Gatto et al., Plasma Transferred Arc Deposition of Powdered High Performances Alloys: Process Parameters Optimization as a Function of Alloy and Geometrical Configuration, Surface & Coatings Technology, vol. 187 (2-3), pp. 265-271 (2004).

George et al., Significant Cost Savings Achieved Through the Use of PDC Bits in Compressed Air/Foam Applications, Society of Petroleum Engineers—SPE 116118, 2008 SPE Annual Technical Conference and Exhibition, Denver, Colorado, Sep. 21-24, 2008.

International Preliminary Report on Patentability for International Application No. PCT/US2009/061239 mailed.

International Search Report for International Application No. PCT/US2009/061239 mailed May 20, 2010, 3 pages.

International Written Opinion for International Application No. PCT/US2009/061239 mailed May 20, 2010, 3 pages.

Kimura et al., "Welding Robot System for Gas Pipe, Water Pipe, Comprises Specific Information Processor for Setting up Welding Program from Several Programs Stored in Memory Unit Based on Information of Objects to be Welded", Aug. 21, 2001, Derwent, AccNo. 2001-60044, pp. 1-2.

Mills Machine Company, Inc., Rotary Hole Openers—Section 8, http://www.millsmachine.com/pages/home_page/mills_catalog/cat_holeopen/cat_holeopen.pdf, retrieved Apr. 27, 2009.

Pessier et al., Hybrid Bits Offer Distinct Advantages in Selected Roller Cone and PDC Bit Applications, IADC/SPE Drilling Conference and Exhibition, Feb. 2-4, 2010, New Orleans.

Ream-While-Drilling Technology Operations Manual (RWD2), © 2007 Baker Hughes Incorporated, pp. 6-148.

Sheppard et al., Rock Drilling—Hybrid Bit Success for Syndax3 Pins, Industrial Diamond Review, Jun. 1993, pp. 309-311.

Smith Services, Hole Opener—Model 6980 Hole Opener, http://www.siismithservices.com/b_products/product_page.asp?ID=589, retrieved May 7, 2008.

Tomlinson et al., Rock Drilling—Syndax3 Pins-New Concepts in PCD Drilling, Industrial Diamond Review, Mar. 1992, pp. 109-114.

Warren et al., PDC Bits, What's Needed to Meet Tomorrow's Challenge, SPE 27978, University of Tulsa Centennial Petroleum Engineering Symposium, Aug. 1994, pp. 207-214.

Wells et al., Bit Balling Mitigation in PDC Bit Design, International Association of Drilling Contractors/Society of Petroleum Engineers—IADC/SPE 114673, IADC/SPE Asia Pacific Drilling Technology Conference and Exhibition, Indonesia, Aug. 25-27, 2008.

Williams et al., An Analysis of the Performance of PDC Hybrid Drill Bits, SPE/IADC 16117, SPE/IADC Drilling Conference, Mar. 1987, pp. 585-594.

* cited by examiner

METHODS FOR AUTOMATED DEPOSITION OF HARDFACING MATERIAL ON EARTH-BORING TOOLS AND RELATED SYSTEMS

CROSS-REFERENCE TO RELATED APPLICATIONS

This application is a continuation of U.S. patent application Ser. No. 13/903,310, filed May 28, 2013, now U.S. Pat. No. 8,969,754, issued Mar. 3, 2015, which is a divisional of U.S. patent application Ser. No. 12/257,219, filed Oct. 23, 2008, now U.S. Pat. No. 8,450,637, issued May 28, 2013, the disclosure of each of which is incorporated herein in its entirety by this reference. The subject matter of this application is related to the subject matter of U.S. patent application Ser. No. 12/341,595, filed Dec. 22, 2008, now U.S. Pat. No. 9,439,277, issued Sep. 6, 2016; U.S. patent application Ser. No. 12/603,734, filed Oct. 22, 2009, now U.S. Pat. No. 8,948,917, issued Feb. 3, 2015, which claims the benefit of U.S. Provisional Patent Application Ser. No. 61/109,427, filed Oct. 29, 2008; U.S. patent application Ser. No. 12/562,797, filed Sep. 18, 2009, now U.S. Pat. No. 8,698,038, issued Apr. 15, 2014; and U.S. patent application Ser. No. 12/651,113, filed Dec. 31, 2009, now U.S. Pat. No. 8,471,182, issued Jun. 25, 2013; the disclosure of each of which is incorporated herein in its entirety by this reference.

FIELD

The present invention relates to a system and method for the application of hardfacing to portions of a drill bit using robotic apparatus.

BACKGROUND

In the exploration of oil, gas, and geothermal energy, wells or boreholes in the earth are created in drilling operations using various types of drill bits. These operations typically employ rotary and percussion drilling techniques. In rotary drilling, the borehole is created by rotating a drill string having a drill bit secured to its lower end. As the drill bit drills the well bore, segments of drill pipe are added to the top of the drill string. While drilling, a drilling fluid is continually pumped into the drilling string from surface pumping equipment. The drilling fluid is transported through the center of the hollow drill string and through the drill bit. The drilling fluid exits the drill bit through one or more nozzles in the drill bit. The drilling fluid then returns to the surface by traveling up the annular space between the well bore and the outside of the drill string. The drilling fluid transports cuttings out of the well bore as well as cooling and lubricating the drill bit.

The type of drill bit used to drill the well will depend largely on the hardness of the formation being drilled. One type of rotary rock drill is a drag bit. Early designs for a drag bit included hardfacing applied to various portions of the bit. Currently, designs for drag bits have extremely hard cutting elements, such as natural or synthetic diamonds, mounted to a bit body. As the drag bit is rotated, the cutting elements form the bottom and sides of the well bore.

Another typical type of rotary drill bit is the tri-cone roller drill bit that has roller cones mounted on the body of the drill bit, which rotate as the drill bit is rotated. Cutting elements, or teeth, protrude from the roller cones. The angles at which the roller cones are mounted on the bit body determine the amount of "cut," or "bite" of the bit with respect to the well bore. As the roller cones of the drill bit roll on the bottom of the hole being drilled, the teeth or carbide inserts apply a high compressive and shear loading to the formation causing fracturing of the formation into debris. The cutting action of roller cones comprises a combination of crushing, chipping and scraping. The cuttings from a roller cone drill bit typically comprise a mixture of chips and fine particles.

Yet another type of rotary drill bit is a hybrid drill bit that has a combination of hard cutting elements, such as natural or synthetic diamonds and roller cones mounted on the body of the drill bit.

There are two general types of roller cone drill bits; TCI bits and steel-tooth bits. "TCI" is an abbreviation for Tungsten Carbide Insert. TCI roller cone drill bits have roller cones having a plurality of tungsten carbide or similar inserts of high hardness that protrude from the surface of the roller cone. Numerous styles of TCI drill bits are designed for various types of formations, in which the shape, number and protrusion of the tungsten carbide inserts on the roller cones of the drill bit will vary, along with roller cone angles on the drill bit.

Steel-tooth roller cone drill bits are also referred to as milled-tooth bits because the steel teeth of the roller cones are formed by a milling machine. However, in larger bits, it is also known to cast the steel teeth and, therefore, "steel-tooth" is a better reference. A steel-tooth roller cone drill bit uses roller cones, with each cone having an integral body of hardened steel with teeth formed on the periphery. There are numerous styles of steel-tooth roller cone drill bits designed for formations of varying hardness in which the shape, number and protrusion of the teeth will vary, along with roller cone angles on the drill bit.

The cost efficiency of a drill bit is determined by the drilling life of the drill bit and the rate at which the drill bit penetrates the earth. Under normal drilling conditions, the teeth of the steel-tooth roller cone drill bits are subject to continuous impact and wear because of their engagement with the rock being drilled. As the teeth are worn away, the penetration rate of the drill bit decreases causing the cost of drilling to increase.

To increase the cost efficiency of a steel-tooth roller cone drill bit or a hybrid drill bit having steel-tooth roller cones, it is necessary to increase the wear resistance of the steel teeth. To accomplish this, it is known to deposit one or more layers of a wear-resistant material or "hardfacing" to the exposed surfaces of the steel teeth. Fusion hardfacing refers to a group of techniques that apply (fuse) a wear-resistant alloy (hardfacing) to a substrate metal. Common hardfacing techniques include arc welding and gas torch welding, among other welding processes.

Conventional welding techniques used to apply hardfacing to steel-tooth roller cone drill bits include oxyacetylene welding (OAW) and atomic hydrogen welding (AHW). Currently, manual welding is typically used in the commercial production of roller cone rock bits. Roller cones are mounted on a positioning table while a welding torch and welding rod are used to manually apply hardfacing to portions of each tooth of each roller cone by a welder moving from tooth to tooth and cone to cone from various positions.

Conventional hardfacing materials used to add wear resistance to the steel teeth of a roller cone drill bit include tungsten carbide particles in a metal matrix, typically cobalt or a mixture of cobalt and other similar metals. Many different compositions of hardfacing material have been employed in the rock bit field to achieve wear-resistance, durability and ease of application. Typically, these hardfacing materials are supplied in the form of a welding rod, but can be found in powder form for use with other types of torches.

The physical indicators for the quality of a hardfacing application include uniformity, thickness, coverage, porosity, and other metallurgical properties. Typically, the skill of the individual applying hardfacing determines the quality of the hardfacing. The quality of hardfacing varies between drill bits as well as between the roller cones of a drill bit, and individual teeth of a roller cone. Limited availability of qualified welders has aggravated the problem because the application of hardfacing is extremely tedious, repetitive, skill-dependent, time-consuming, and expensive. The application of hardfacing to roller cones is considered the most tedious and skill-dependent operation in the manufacture of a steel-toothed roller cone drill bit. The consistency of the application of hardfacing to a drill bit by a skilled welder varies over different portions of the drill bit.

To summarize, manually applying hardfacing to a roller cone involves the continuous angular manipulation of a torch over the roller cone, the roller cone held substantially stationary, but being rotated on a positioning table. After hardfacing is manually applied to a surface of each tooth of the roller cone using a torch and welding rod containing the hardfacing material, the positioning table and cutter are indexed to a new angle and position to permit application of hardfacing to a surface of the next tooth of the roller cone until all the cutters have been rotated 360 degrees. At that time, the angle of the table and cutter is adjusted for the application of hardfacing to another tooth surface or row of teeth of the roller cone.

When attempts to utilize robotics to automate the welding process were made, the same configuration was used having a robotic arm to replace the human operator's arm and its varied movements, while leaving the roller cone on a positioning table. The positioning table is capable of automatic indexing between teeth and rows of teeth of a roller cone.

This configuration and procedure would be expected to provide the recognized benefits of manual hardfacing for a number of reasons. First, manual and automatic torches are much lighter and easier to continuously manipulate than the heavy steel cutters with teeth protruding in all directions. Second, the roller cone must be electrically grounded, and this can be done easily through the stationary positioning table. Third, gravity maintains the heavy roller cone in position on the positioning table. Fourth, highly angled (relative to vertical) manipulation of the torch allows access to confined spaces between teeth of the roller cone and is suited to the highly articulated movement of a robotic arm.

U.S. Pat. No. 6,392,190 provides a description of the use of a robotic arm in hardfacing of roller cones, in which the torch is held by a robotic arm and the roller cones are moved on a positioning table. A manual welder is replaced with a robotic arm for holding the torch. The robotic arm and a positioning table are combined to have more than five movable axes in the system for applying hardfacing. However, U.S. Pat. No. 6,392,190 does not describe details of solutions to the numerous obstacles in automating the hardfacing of roller cones using robotic arms and positioners.

One factor limiting use of robotic hardfacing has been the unsatisfactory appearance of the final product when applied using robotically held torches over stationary cutters. Another factor limiting use of robotic hardfacing to rolling cutters is the commercial unavailability of a material that directly compares to conventional Oxygen Acetylene Welding (OAW) welding rod materials that can be applied with commercially available Plasma Transferred Arc (PTA) torches.

Another factor limiting use of robotic hardfacing is the inability to properly identify and locate individual roller cone designs within a robotic hardfacing system. The roller cones of each size of drill bit and style of drill bit are substantially different, and initiating the wrong program could cause a collision of the torch and part, resulting in catastrophic failure and loss. Another factor limiting use of robotic hardfacing is the inability to correct the critical positioning between the torch and roller cone in response to manufacturing variations of the cutter, wear of the torch, and buildup of hardfacing.

Still another factor limiting use of robotic hardfacing has been the inability to properly access many of the areas on the complex surface of a roller cone that require hardfacing with commercially available Plasma Transferred Arc (PTA) torches large enough to permit application of the required material. A small form factor (profile) is required to access the roots of the teeth of a roller cone that are close together. However, most conventional PTA torches require large powder ports to accommodate the flow of the medium-to-large mesh powder required for good wear resistance. Torches with smaller nozzles have smaller powder ports that prohibit proper flow of the desired powders.

Another factor limiting use of robotic hardfacing is the complexity of programming a control system to coordinate the critical paths and application sequences needed to apply the hardfacing. For example, undisclosed in the prior art, the known torch operating parameters, materials, application sequences, and procedures used for decades in manual hardfacing operations have proven to be mostly irrelevant to robotic hardfacing of roller cones. A related factor limiting use of robotic hardfacing is the cost and limitation of resources. A significant investment and commitment of machine time are required to create tests, evaluate results, modify equipment, and incrementally adjust the several operating parameters, and then integrate the variations into production part programs. These and several other obstacles have, until now, limited or prevented any commercial practice of automated hardfacing of roller cones.

Therefore, there is a need to develop a system and method for applying hardfacing to roller cones consistent with the highest material and application quality standards obtainable by manual welding. There is also a need to develop a system that identifies parts, selects the proper program, and provides programmed correction in response to manufacturing variations of the roller cones, wear of the torch, and buildup of hardfacing. There is also a need to develop a PTA torch design capable of accessing more of the areas on a roller cone's cutter that require hardfacing. There is also a need to develop a hardfacing material, the performance of which will compare favorably to conventional Oxygen Acetylene Welding (OAW) materials and flow properly through the PTA torch design.

BRIEF SUMMARY

A system and method for the application of hardfacing to surfaces of drill bits is disclosed.

In some embodiments, methods for depositing hardfacing material on portions of drill bits comprise providing a vertically oriented plasma transfer arc torch secured to a positioner having controllable movement in a substantially vertical plane. A rolling cutter is secured to a chuck mounted on an articulated arm of a robot. A surface of a tooth of the rolling cutter is positioned in a substantially perpendicular relationship beneath the torch. The torch is oscillated along a substantially horizontal axis. The rolling cutter is moved with the articulated arm of the robot in a plane beneath the oscillating torch. A hardfacing material is deposited on the tooth of the rolling cutter.

In other embodiments, methods for depositing hardfacing material on portions of drill bits comprise providing a vertically oriented plasma transfer arc torch secured to a positioner having controllable movement in a substantially vertical plane. A cutter is secured to a chuck mounted on an articulated arm of a robot. A surface of a tooth of the cutter is positioned in a substantially perpendicular relationship beneath the torch. A first waveform target path is provided and the torch is oscillated along a substantially horizontal axis. The cutter is moved with the articulated arm of the robot beneath the midpoint of the oscillating torch path so as to impose a second torch waveform onto the first waveform target path to create a hardfacing pattern on a tooth.

In still other embodiments, methods for depositing hardfacing material on the teeth of rolling cutters of rock bits, wherein the rolling cutter has protruding teeth on a plurality of rows, comprise providing a vertically oriented plasma transfer arc torch, secured to a positioner in a substantially vertical plane. The rolling cutter is secured to a chuck mounted on an articulated arm of a robot and a surface of a tooth of the rolling cutter is positioned in a substantially horizontal plane beneath the torch. A bead of hardfacing material is deposited on the tooth of the rolling cutter while moving the rolling cutter with the articulated arm of the robot.

In yet other embodiments, methods for hardfacing portions of drill bits comprise providing a portion of a drill bit having thin and thick portions and providing a plasma transfer arc torch secured to a positioner having program controllable motion. One of a portion of the drill bit and the drill bit is secured to a chuck mounted on an articulated arm of a robot having programmable controlled motion. A weld path is begun at the thin portion of the drill bit and hardfacing is deposited in a path directed towards the thick portion of the drill bit. Torch amperage is increased in proportion to a weld area as the torch path moves towards the thick portion of the drill bit.

In other embodiments, methods for hardfacing rock bits comprise providing a drill bit and providing indexing indicium on the drill bit. A positioning sensor is indexed to the indicium on the drill bit to determine the location of the drill bit. A torch location is calibrated to the drill bit based indexed drill bit location.

BRIEF DESCRIPTION OF THE SEVERAL VIEWS OF THE DRAWINGS

The objects and features of the invention will become more readily understood from the following detailed description and appended claims when read in conjunction with the accompanying drawings in which like numerals represent like elements.

The drawings constitute a part of this specification and include exemplary embodiments of the invention, which may be embodied in various forms. It is to be understood that in some instances various aspects of the invention may be shown as exaggerated or enlarged to facilitate an understanding of the invention.

DETAILED DESCRIPTION

Figure 1:
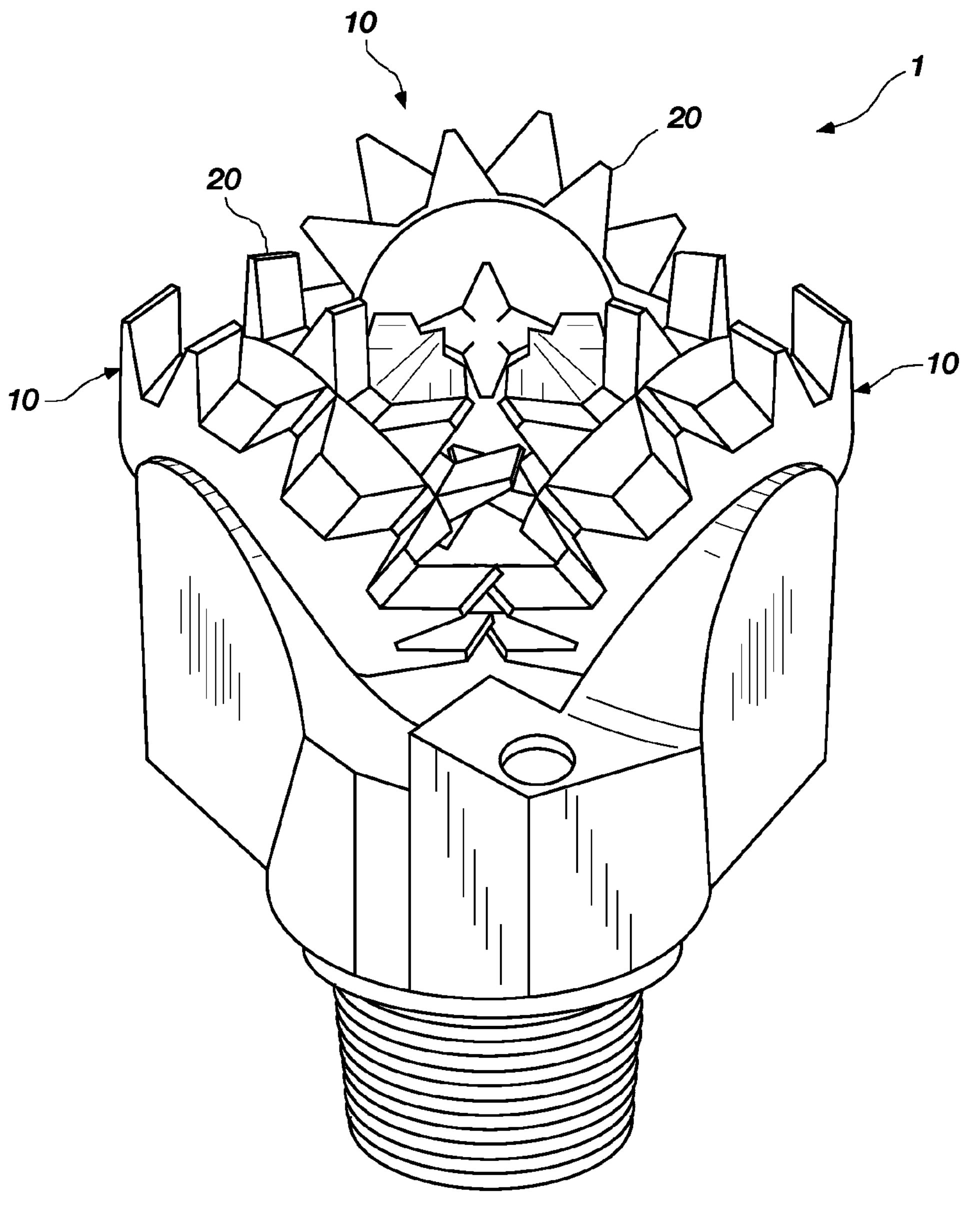
FIG. 1 is a side view of a steel-tooth drill bit.

The system and method of the present invention have an opposite configuration and method of operation to that of manual hardfacing and prior automated hardfacing systems. In the present system and method a robotic system is used, having a plasma transfer arc torch secured in a substantially vertical position to a torch positioner in a downward orientation. The torch positioner is program-controllable in a vertical plane. Shielding, plasma, and transport gases are supplied to the torch through electrically controllable flow valves. Rather than use a torch positioner, a robotic arm can be used having a transfer arc torch secured thereto in a substantially vertical position in a downward orientation. For handling a roller cone, a robot having program controllable movement of an articulated arm is used. A chuck adapter is attached to the arm of the robot. A three jaw chuck is attached to the chuck adapter. The chuck is capable of securely holding a roller cone in an inverted position.

A first position sensor is positioned for determining the proximity of the torch to a surface of the roller cone. A second position sensor may be positioned for determining the location, orientation, or identification of the roller cone. A programmable control system is electrically connected to the torch, the torch positioner or robotic arm having the torch mounted thereon, the robot, shielding, plasma, and transport gas flow valves, and the position sensors programmed for operation of each. The robot is programmed to position a surface of a cutter below the torch prior to the application of welding material to the roller cone.

In this configuration, the torch is oscillated in a horizontal path. The roller cone is manipulated such that a programmed target path for each tooth surface is followed beneath the path midpoint (or equivalent indicator) of the oscillating torch. The movement of the roller cone beneath the torch generates a waveform pattern of hardfacing. In a preferred embodiment, the target path is a type of waveform path as well. Imposing the torch waveform onto the target path waveform generates a high-quality and efficient hardfaced coating on the roller cone. In another preferred embodiment, the roller cone is oscillated in relation to the torch as it follows the target path. This embodiment provides the ability to generate unique and desirable hardfacing patterns on the surface of the cutter, while maintaining symmetry and coverage.

An advantage of the system and method of the present invention is that it automates the hardfacing application of roller cones or any other desired portion of a drill bit, which increases the consistency and quality of the applied hardfacing, and thus the reliability, performance, and cost efficiency of the roller cone and the drill bit. Another advantage of the system and method of present invention is that it reduces manufacturing cost and reliance on skilled laborers. Another advantage of the system and method of the present invention is that by decreasing production time, product inventory levels can be reduced. Another advantage of the system and method of the present invention is that it facilitates the automated collection of welding data, from which further process controls and process design improvements can be made.

Another advantage of the system and method of the present invention is that utilization of the robotic arm to manipulate the roller cone and a robotic arm having the torch mounted thereon improves the opportunity to integrate sensors for providing feedback. Another advantage of the system and method of the present invention is that utilization of the robotic arm to manipulate the roller cone provides the necessary surface-to-torch angularity for access, without disrupting the flow of the powder due to changes in the angle of the torch.

As referred to hereinabove, the "system and method of the present invention" refers to one or more embodiments of the invention, which may or may not be claimed, and such references are not intended to limit the language of the claims, or to be used to construe the claims. The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 2:
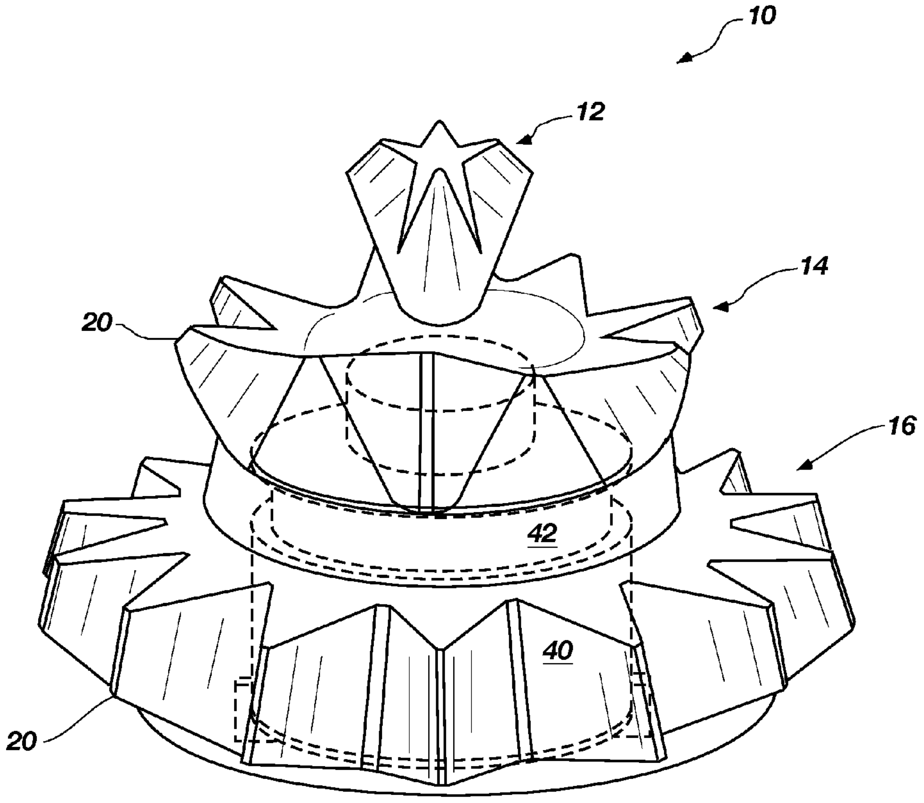
FIG. 2 is an isometric view of a typical steel-tooth cutter such as might be used on the steel-tooth drill bit of FIG. 1.

FIG. 1 is a side view of a steel-tooth roller cone drill bit 1. The drill bit 1 has a plurality of roller cones 10. FIG. 2 is an isometric view of a typical steel-tooth roller cone 10 such as might be used on the drill bit of FIG. 1. Steel-tooth roller cone 10 has a plurality of rows of teeth 20. In FIG. 2, roller cone 10 has an inner row of teeth 12, an intermediate row of teeth 14, and an outer row of teeth 16. Each of rows of teeth 12, 14, and 16 has one or more teeth 20 therein.

Figure 1A:
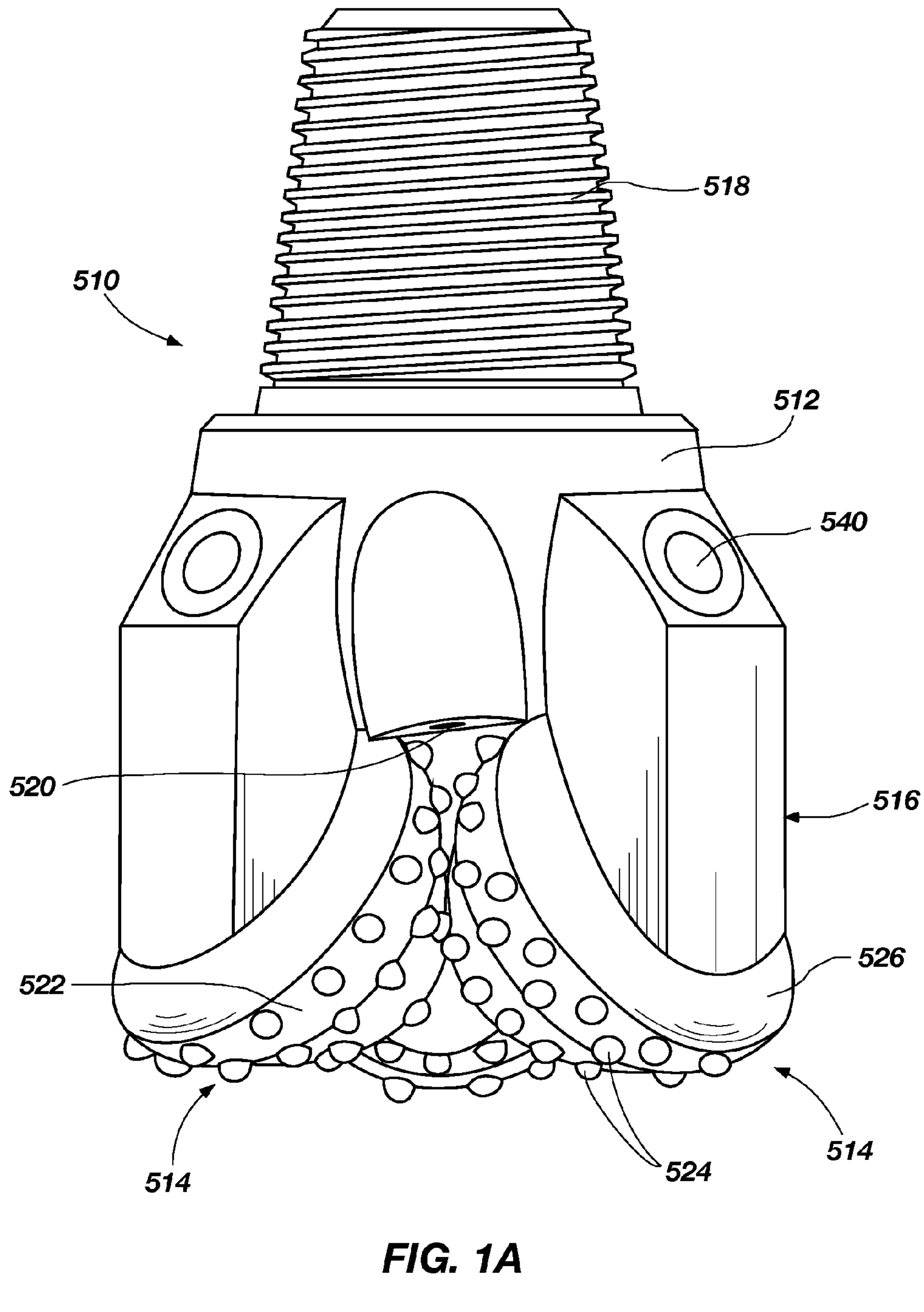
FIG. 1A is a side elevational view of an earth-boring drill bit according to an embodiment of the present invention.

FIG. 1A is a side elevational view of an earth-boring drill bit 510 according to another embodiment of the present invention. The earth-boring drill bit 510 includes a bit body 512 and a plurality of rotatable cutter assemblies 514. The bit body 512 may include a plurality of integrally formed bit legs 516, and threads 518 may be formed on the upper end of the bit body 512 for connection to a drill string (not shown). The bit body 512 may have nozzles 520 for discharging drilling fluid into a borehole, which may be returned along with cuttings up to the surface during a drilling operation. Each of the rotatable cutter assemblies

514 include a cone 522 comprising a particle-matrix composite material and a plurality of cutting elements, such as the cutting inserts 524 shown. Each cone 522 may include a conical gage surface 526. Additionally, each cone 522 may have a unique configuration of cutting inserts 524 or cutting elements, such that the cones 522 may rotate in close proximity to one another without mechanical interference.

Figure 1B:
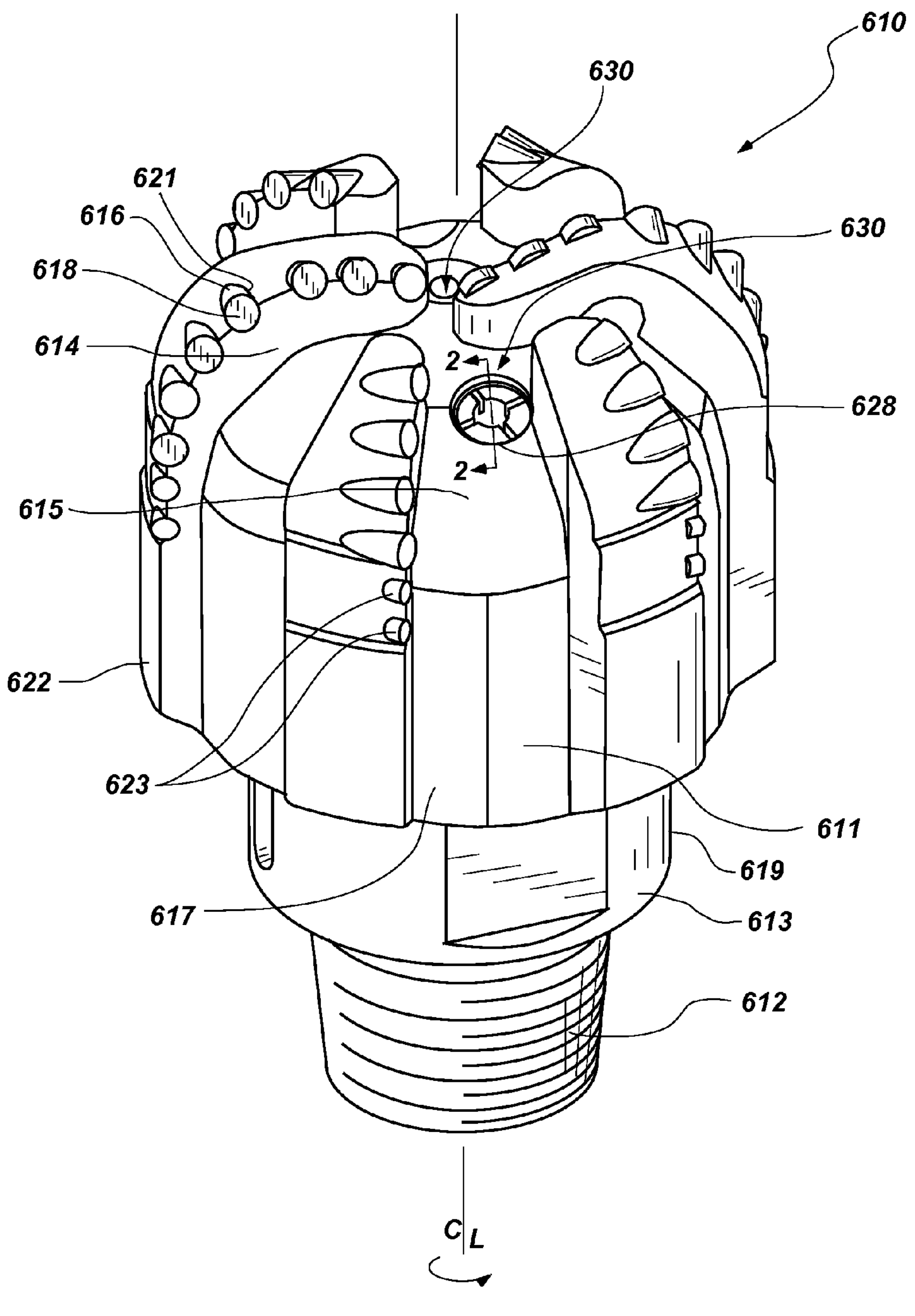
FIG. 1B is a side elevational view of a drag bit type earth-boring drill bit according to an embodiment of the present invention.

FIG. 1B illustrates a drill bit 610 incorporating a plurality of nozzle assemblies 630 therein. The drill bit 610 is configured as a fixed-cutter rotary full bore drill bit, also known in the art as a "drag bit." The drill bit 610 includes a crown or bit body 611 composed of steel body or sintered tungsten carbide body coupled to a support 619. The support 619 includes a shank 613 and a crossover component (not shown) coupled to the shank 613 in this embodiment of the invention by using a submerged arc weld process to form a weld joint therebetween. The crossover component (not shown), which is manufactured from a tubular steel material, is coupled to the bit body 611 by pulsed MIG process to form a weld joint therebetween in order to allow the complex tungsten carbide material, when used, to be securely retained to the shank 613. It is recognized that the support 619, particularly for other materials used to form a bit body, may be made from a unitary material piece or multiple pieces of material in a configuration differing from the shank 613 being coupled to the crossover by weld joints as presented. The shank 613 of the drill bit 610 includes conventional male threads 612 configured to API (American Petroleum Institute) standards and adapted for connection to a component of a drill string, not shown. The face 614 of the bit body 611 has mounted thereon a plurality of cutting elements 616, each comprising a polycrystalline diamond (PCD) table 618 formed on a cemented tungsten carbide substrate. The cutting elements 616, conventionally secured in respective cutter pockets 621 by brazing, for example, are positioned to cut a subterranean formation being drilled when the drill bit 610 is rotated under weight-on-bit (WOB) in a borehole. The bit body 611 may include gage trimmers 623 including the aforementioned PCD tables 618 configured with a flat edge aligned parallel to the rotational axis (not shown) of the drill bit 610 to trim and hold the gage diameter of the borehole, and gage pads 622 on the gage which contact the walls of the borehole to maintain the hole diameter and stabilize the drill bit 610 in the hole.

During drilling, drilling fluid is discharged through nozzle assemblies 630 located in sleeve ports 628 in fluid communication with the face 614 of bit body 611 for cooling the PCD tables 618 of cutting elements 616 and removing formation cuttings from the face 614 of drill bit 610 into passages 615 and junk slots 617.

Figure 2A:
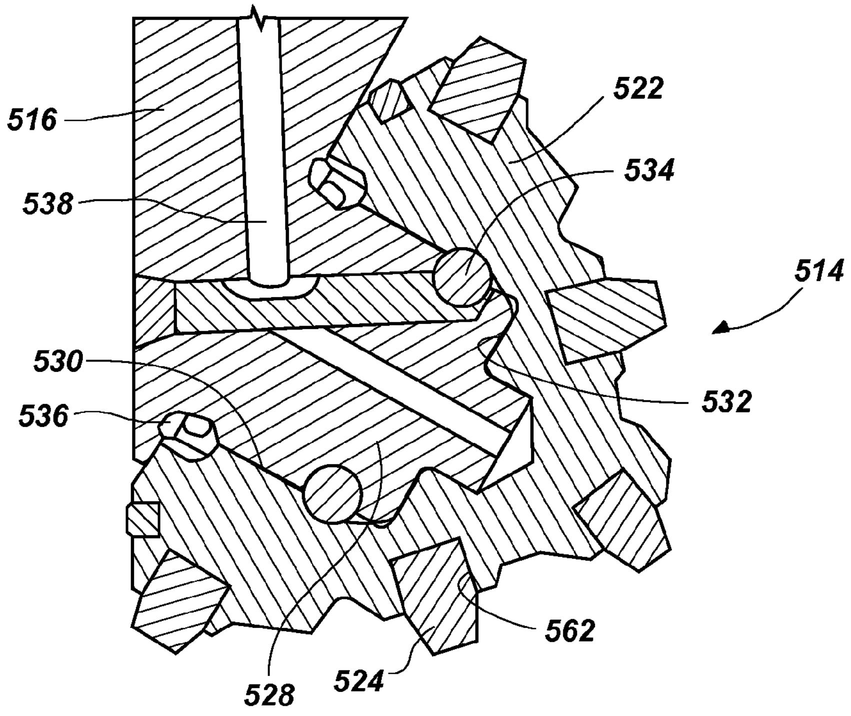
FIG. 2A is a partial sectional view of an embodiment of a rotatable cutter assembly, including a cone, of the present invention that may be used with the earth-boring drill bit shown in FIG. 1A.

In FIG. 2, as shown by the dashed lines, an interior of roller cone 10 of drill bit 1 of FIG. 1 includes a cylindrical journal race 40 and a semi-torus shaped ball race 42. Journal race 40 and ball race 42 are internal bearing surfaces that are machined finish after hardfacing 38 (see FIG. 4) has been applied to teeth 20. FIG. 2A is a cross-sectional view illustrating one of the rotatable cutter assemblies 514 of the earth-boring drill bit 510 shown in FIG. 1A. As shown, each bit leg 516 may include a bearing pin 528. The cone 522 may be supported by the bearing pin 528, and the cone 522 may be rotatable about the bearing pin 528. Each cone 522 may have a central cone cavity 530 that may be cylindrical and may form a journal bearing surface adjacent the bearing pin 528. The cone cavity 530 may have a flat thrust shoulder 532 for absorbing thrust imposed by the drill string (not shown) on the cone 522. As illustrated in this example, the cone 522 may be retained on the bearing pin 528 by a plurality of locking balls 534 located in mating grooves formed in the surfaces of the cone cavity 530 and the bearing pin 528. Additionally, a seal assembly 536 may seal bearing spaces between the cone cavity 530 and the bearing pin 528. The seal assembly 536 may be a metal face seal assembly, as shown, or may be a different type of seal assembly, such as an elastomer seal assembly. Lubricant may be supplied to the bearing spaces between the cone cavity 530 and the bearing pin 528 by lubricant passages 538. The lubricant passages 538 may lead to a reservoir that includes a pressure compensator 540 (FIG. 1A).

As previously mentioned, the cone 522 may comprise a sintered particle-matrix composite material that comprises a plurality of hard particles dispersed through a matrix material. In some embodiments, the cone 522 may be predominantly comprised of the particle-matrix composite material.

Figure 2B:
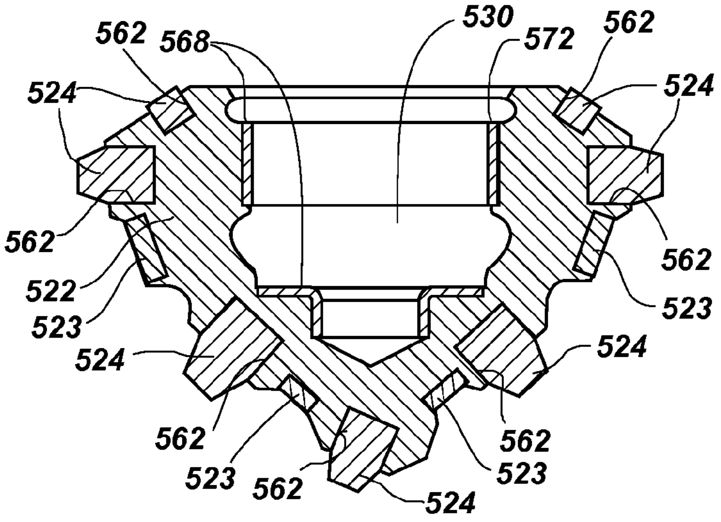
FIG. 2B is a sectional view of another embodiment of a rotatable cone of the present invention that may be used with the earth-boring drill bit shown in FIG. 1A.

FIG. 2B is a cross section of a cone 522 formed after assembling the various green components to form a structure sintered to a desired final density to form the fully sintered structure shown in FIG. 2B. During the sintering process of the cone 522, including the apertures 562 or other features, the cutting inserts 524 or other cutting elements, and bearing structures 568 may undergo shrinkage and densification. Furthermore, the cutting inserts 524 and the bearing structures 568 may become fused and secured to the cone 522 to provide a substantially unitary cutter assembly 514 (see FIB. 2A).

After the cutter assembly 514' has been sintered to a desired final density, various features of the cutter assembly 514' may be machined and polished, as necessary or desired. For example, bearing surfaces on the bearing structures 568 may be polished. Polishing the bearing surfaces of the bearing structures 568 may provide a relatively smoother surface finish and may reduce friction at the interface between the bearing structures 568 and the bearing pin 528 (FIG. 2A). Furthermore, the sealing edge 572 of the bearing structures 568 also may be machined and/or polished to provide a shape and surface finish suitable for sealing against a metal or elastomer seal, or for sealing against a sealing surface located on the bit body 512 (FIG. 1A).

The cutting inserts 524, lands 523, and bearing structures 568 may be formed from particle-matrix composite materials. The material composition of each of the cutting inserts 524, lands 523, bearing structures 568, and cone 522 may be separately and individually selected to exhibit physical and/or chemical properties tailored to the operating conditions to be experienced by each of the respective components. By way of example, the composition of the cutting inserts 524 and the lands 523 may be selected so as to form cutting inserts 524 comprising a particle-matrix composite material that exhibits a different hardness, wear resistance, and/or toughness different from that exhibited by the particle-matrix composite material of the cone 522.

The cutting inserts 524 and lands 523 may be formed from a variety of particle-matrix composite material compositions. The particular composition of any particular cutting insert 524 and lands 523 may be selected to exhibit one or more physical and/or chemical properties tailored for a particular earth formation to be drilled using the drill bit 510 (FIG. 1A). Additionally, cutting inserts 524 and lands 523 having different material compositions may be used on a single cone 522.

By way of example, in some embodiments of the present invention, the cutting inserts 524 and the lands 523 may comprise a particle-matrix composite material that includes a plurality of hard particles that are harder than a plurality of hard particles of the particle-matrix composite material of the cone 522. The concentration of the hard particles in the particle-matrix composite material of the cutting inserts 524 and the lands 523 may be greater than a concentration of hard particles in a particle-matrix composite material of the cone 522.

Figure 3:
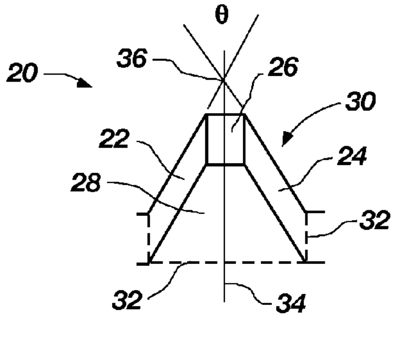
FIG. 3 is an isometric view of a typical steel-tooth such as might be located on the steel-tooth cutter of FIG. 2.

FIG. 3 is an isometric view of a steel-tooth 20 located on steel-tooth roller cone 10 of FIG. 2. Tooth 20 has an included tooth angle of θ degrees formed at a vertex 36. Tooth 20 has a leading flank 22 and an opposite trailing flank 24. Leading flank 22 and trailing flank 24 are joined at crest 26, which is the top of tooth 20. A generally triangular outer end 28 is formed between leading flank 22, trailing flank 24, and crest 26. On the opposite side of tooth 20, a generally triangular inner end 30 is formed between leading flank 22, trailing flank 24, and crest 26. A base 32 broadly defines the bottom of tooth 20 and the intersection of tooth 20 with roller cone 10. Various alternatively shaped teeth on roller cone 10 may be used, such as teeth having T-shaped crests. Tooth 20 represents a common shape for a tooth, but the system and method of the present invention may be used on any shape of tooth.

Figure 4:
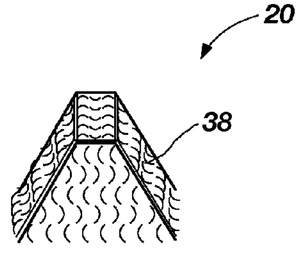
FIG. 4 is an isometric view of the steel-tooth of FIG. 3 after hardfacing has been applied.

To prevent early wear and failure of drill bit 1 (see FIG. 1), it is necessary to apply an extremely wear-resistant material, or hardfacing 38, to surfaces 22, 24, 26, 28, and 30 of tooth 20. FIG. 4 is an isometric view of a typical steel-tooth 20 such having hardfacing 38 applied to surfaces 22, 24, 26, 28, and 30, as shown in FIG. 3.

Figure 5:
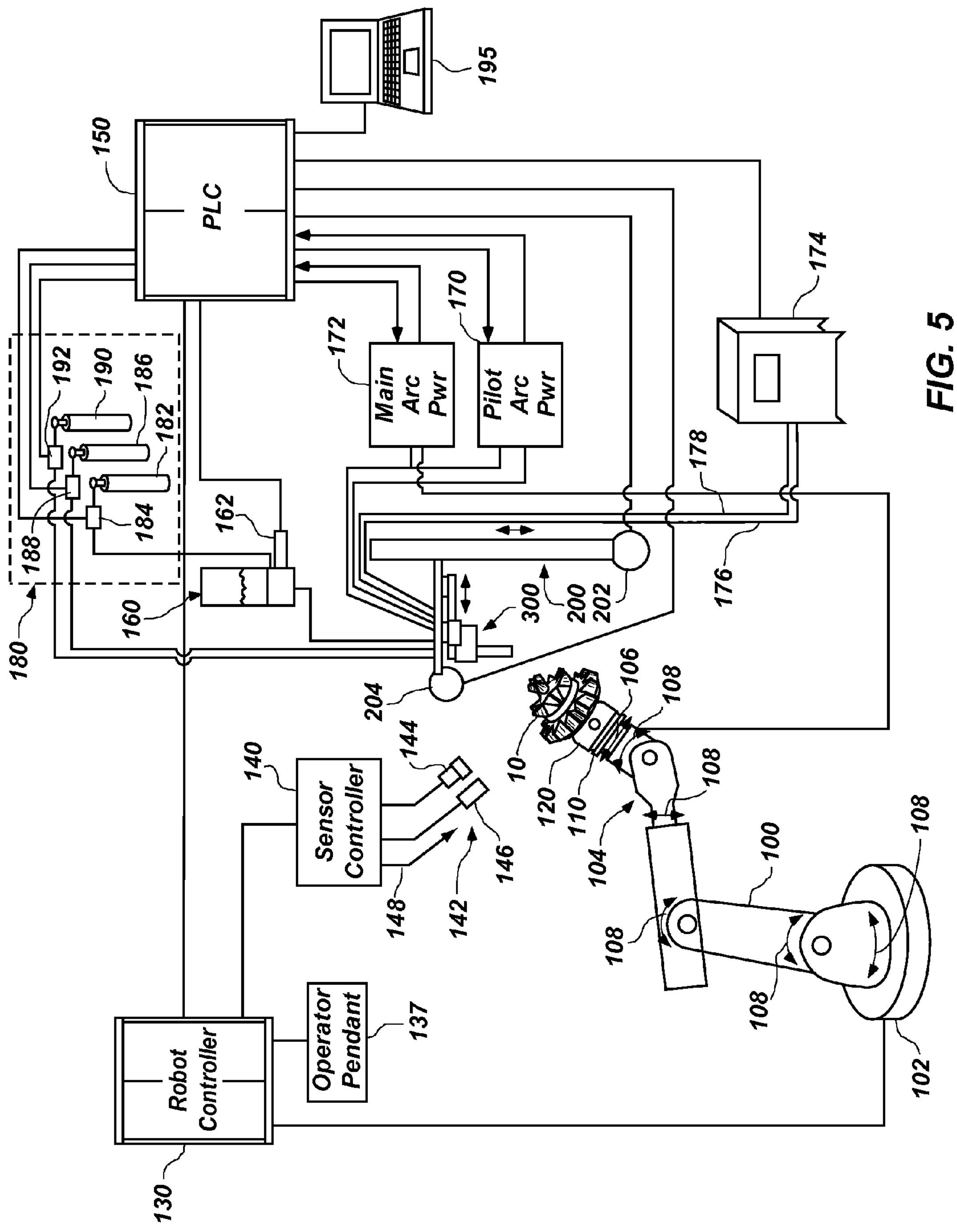
FIG. 5 is a schematic of a preferred embodiment of a robotic welding system of the present invention for a cone.
Figure 5A:
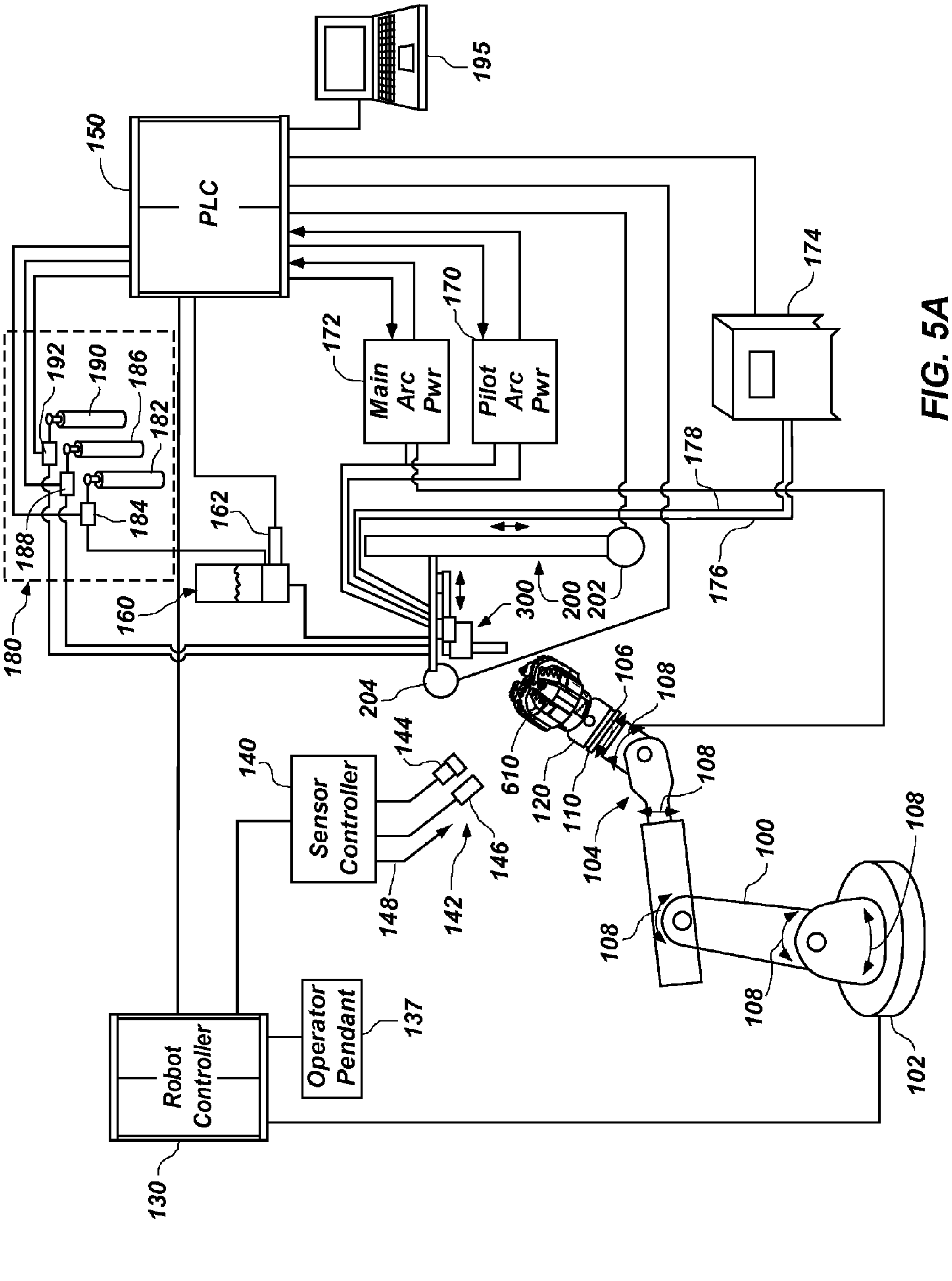
FIG. 5A is a schematic of another embodiment of the robotic welding system of the present invention for a drag type drill bit.

FIGS. 5 and 5A are schematic illustrations of the system of the present invention. Seen in FIG. 5 is an industrial robot 100 having a stationary base 102 and an articulated arm 104. Articulated arm 104 has a distal end 106. Robot 100 has a plurality of axes of rotation 108 about which controllable movement permits wide-range positioning of distal end 106 relative to base 102. Robot 100 has six or more independently controllable axes of movement between base 102 and the distal end 106 of arm 104. FIG. 5A illustrates a drill bit 610 attached to the articulated arm 104, although drill bit 610 or drill bit 1 (see FIG. 1) or portions of any drill bit may be attached to articulated arm 104 for the application of hardfacing to portions thereof.

Robot 100 has a handling capacity of at least 125 kg, and articulated arm 104 has a wrist torque rating of at least 750 nm. Examples of industrial robots that are commercially available include models IRB 6600/IRB 6500, which are available from ABB Robotics, Inc., 125 Brown Road, Auburn Hills, Mich., USA, 48326-1507.

An adapter 110 is attached to distal end 106. Adapter 110 has a ground connector 112 (see FIG. 7) for attachment to an electrical ground cable 114. A chuck 120 is attached to adapter 110. Chuck 120 securely grips roller cone 10 at journal bearing surface 40 (see FIG. 2) and/or ball race 42 (see FIG. 2), as shown in greater detail in FIGS. 8 and 9.

A heat sink, or thermal barrier, is provided between roller cone 10 and adapter 110 to prevent heat from causing premature failure of the rotating axis at distal end 106 of articulated arm 104. The thermal barrier is an insulating spacer (not shown) located between roller cone 10 and distal end 106 of robot 100. Alternatively, roller cone 10 may be gripped in a manner that provides an air space between roller cone 10 and distal end 106 of robot 100 to dissipate heat.

A robot controller 130 is electrically connected to robot 100 for programmed manipulation of robot 100, including movement of articulated arm 104. An operator pendant 137 may be provided as electrically connected to robot controller 130 for convenient operator interface with robot 100. A sensor controller 140 is electrically connected to robot controller 130. Sensor controller 140 may also be electrically connected to a programmable logic controller 150.

A plurality of sensors 142 are electrically connected to sensor controller 140. Sensors 142 include a camera 144 and/or a contact probe 146. Alternatively, sensors 142 include a suitable laser proximity indicator 148 (illustrated as an arrow). Other types of sensors 142 may also be used. Sensors 142 provide interactive information to robot controller 130, such as the distance between a tooth 20 on roller cone 10 and torch 300.

A programmable logic controller 150 is electrically connected to robot controller 130. Programmable logic controller (PLC) 150 provides instructions to auxiliary controllable devices that operate in coordinated and programmed sequence with robot 100.

A powder dosage system 160 is provided for dispensing hardfacing powder to the system. A driver 162 is electrically connected to PLC 150 for dispensing the powder at a predetermined, desired rate.

A pilot arc power source 170 and a main arc power source 172 are electrically connected to PLC 150. A cooling unit 174 is electrically connected to PLC 150. In a preferred embodiment, a data-recording device 195 is electrically connected to PLC 150.

A gas dispensing system 180 is provided. A transport gas source 182 supplies transport gas through a flow controller 184 to carry or transport hardfacing welding powder to torch 300. Flow controller 184 is electrically connected to PLC 150, which controls the operation of flow controller 184 and the flow and flow rate of the transport gas. A plasma gas source 186 supplies gas for plasma formation through a flow controller 188. Flow controller 188 is electrically connected to PLC 150, which controls the operation of flow controller 188 and the flow and flow rate of the plasma gas. Similarly, a shielding gas source 190 supplies shielding gas through a flow controller 192. Flow controller 192 is electrically connected to PLC 150, which controls the operation of flow controller 192 and the flow and flow rate of the shielding gas. It is known to utilize a single gas source for more than one purpose, e.g., plasma, shielding, and transport. Thus, different, multiple flow controllers connected in a series alignment can control the flow and flow rate of gas from a single gas source.

The torch 300 comprises a plasma transferred arc (PTA) torch, that receives hardfacing welding powder from powder dosage system 160, and plasma, transport, and shielding gases from their respective supplies and controllers in gas dispensing system 180. Torch 300 is secured to a positioner or positioning table 200, which grips and manipulates torch 300. In a preferred embodiment, positioner 200 is capable of programmed positioning of torch 300 in a substantially vertical plane. A positioner 200 has a vertical drive 202 and a horizontal drive 204. Drives 202 and 204 may be toothed belts, ball screws, a toothed rack, pneumatic, or other means. If desired, an industrial robot 100 having six independently controllable axes of movement between base 102 and distal end 106 of arm 104 as described herein may be used as the positioner 200 having the torch 300 mounted thereon.

Figure 6:
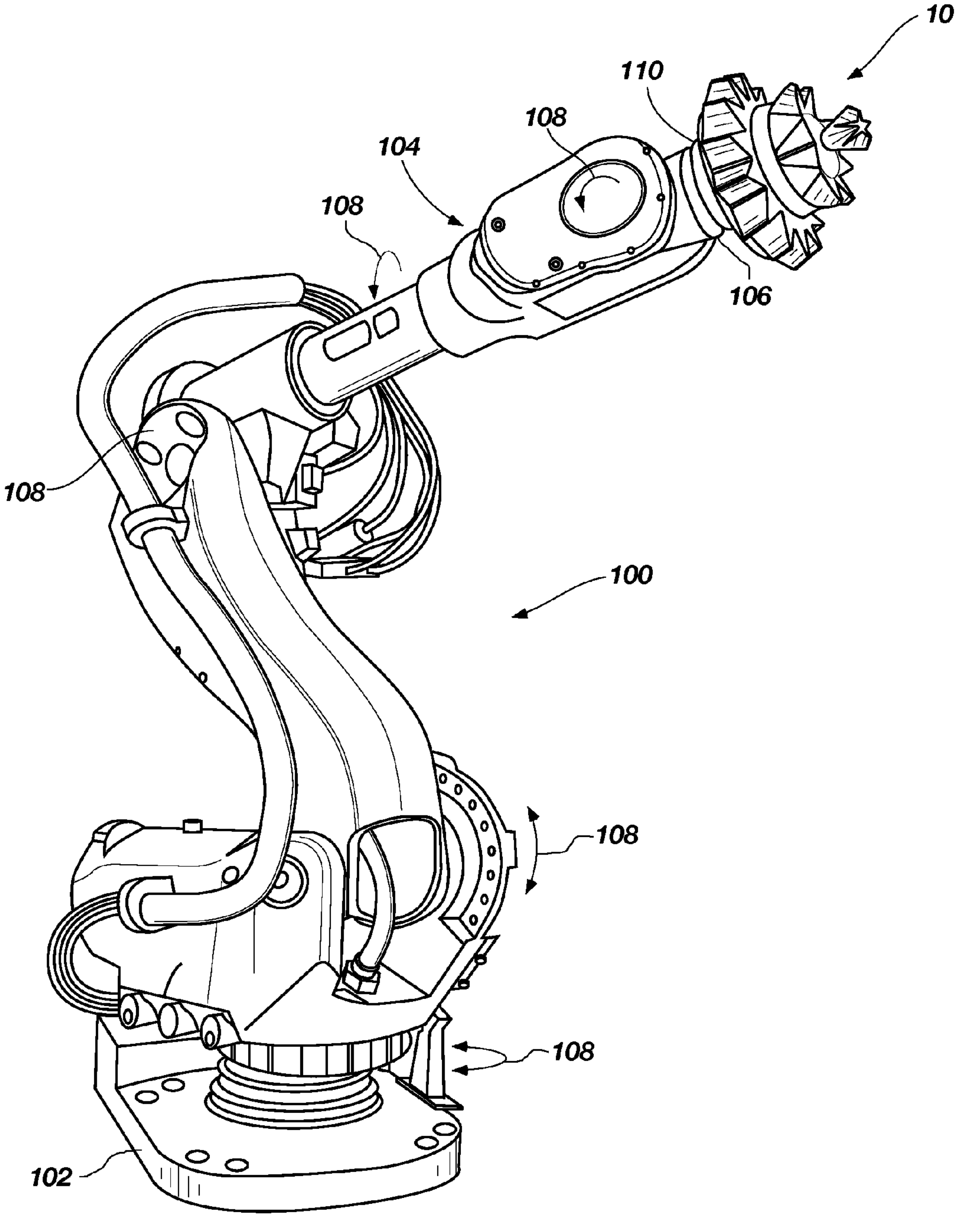
FIG. 6 is an isometric view of a robot manipulating a cutter to be hardfaced.
Figure 7:
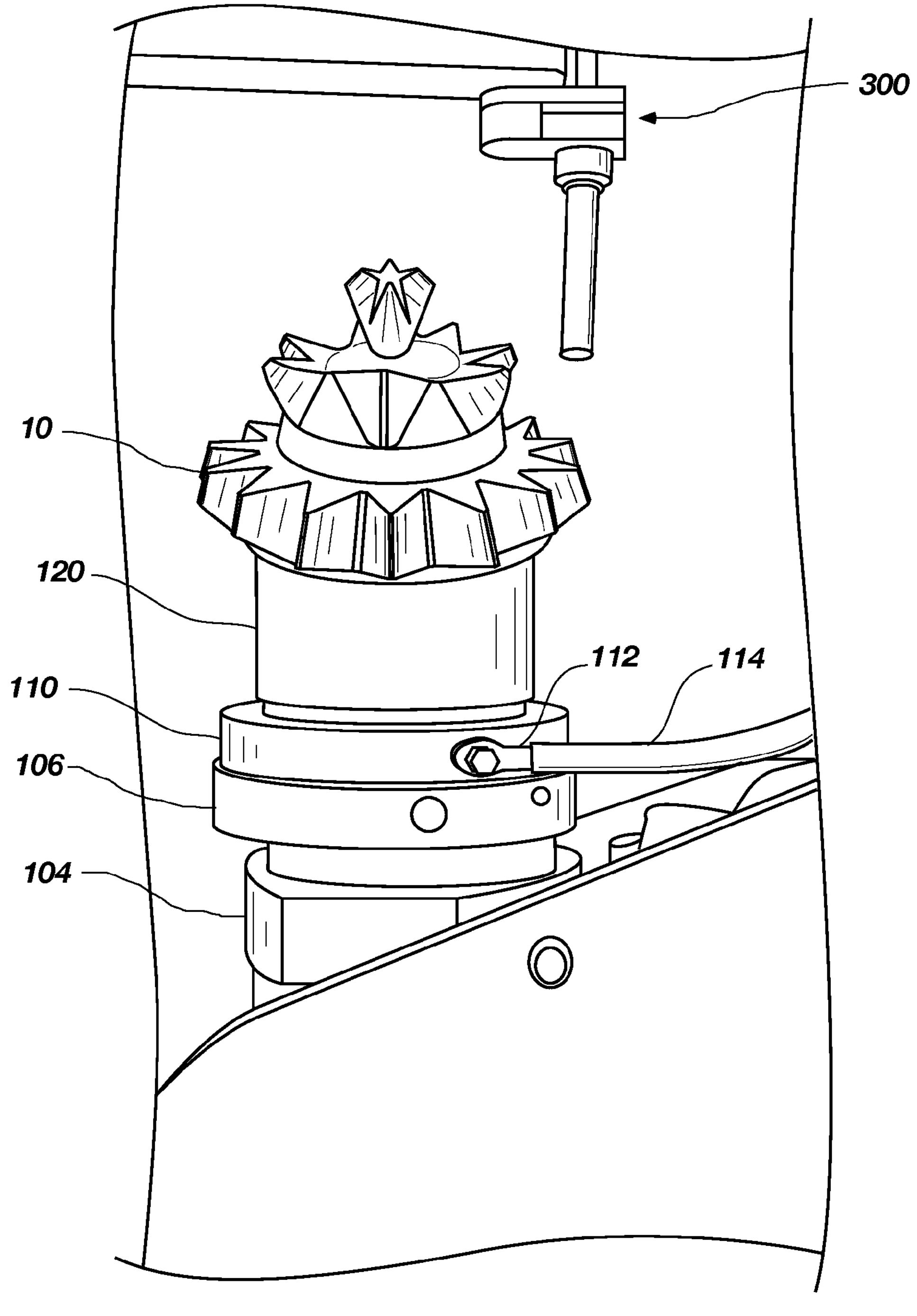
FIG. 7 is an isometric view of a cutter positioned beneath a torch in preparation for the application of hardfacing.

FIGS. 6 and 7 are isometric views of robot 100 shown manipulating roller cone 10 secured to adapter 110 on distal end 106 of articulated arm 104 of robot 100. As illustrated in FIG. 6 and in FIGS. 13-16, the several axes of rotation 108 provide sufficient degrees of freedom to permit vertical, horizontal, inverted, and rotated positioning of any tooth 20 of roller cone 10 directly beneath torch 300. As illustrated in FIG. 7, roller cone 10 is positioned beneath torch 300 in preparation for the application of hardfacing 38 (see FIG. 4).

Adapter 110 is aligned by indicator with articulated arm 104. Adapter 110 is aligned to run substantially true with a programmable axis of movement of robot 100. A chuck 120 is attached to adapter 110 and indicator aligned to within 0.005 inch of true center rotation. Roller cone 10 is held by chuck 120 and also centered by indicator alignment. Roller cone 10 has grooves that permit location and calibration of the end of torch 300. Electrode 304 (see FIG. 11) of torch 300 is then used to align roller cone 10 about the z-axis of rotation of roller cone 10 by robot 100.

As illustrated in FIG. 7, electrical ground cable 114 is electrically connected to adapter 110 by ground connector 112, a rotatable sleeve connector. Alternatively, ground connector 112 is a brush connector. Ground cable 114 is supported by a tool balancer (not shown) to keep it away from the heat of roller cone 10 and the welding arc during hardfacing operations. Chuck 120 is attached to adapter 110. Roller cone 10 is held by chuck 120.

As roller cones 10 are manipulated vertically, horizontally, inverted, and rotated beneath torch 300, highly secure attachment of roller cone 10 to robot 100 is required for safety and accuracy of the hardfacing operation. Precision alignment of roller cones 10 in relation to chuck 120 is also necessary to produce a quality hardfacing and to avoid material waste.

Figure 8:
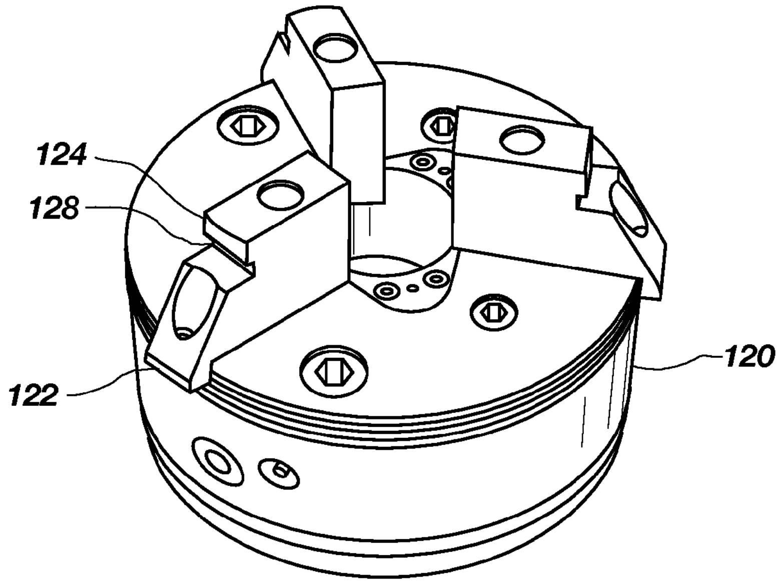
FIG. 8 is an isometric view of a chuck of a preferred type to be attached to an end of a robot.

FIG. 8 is an isometric view of chuck 120, a three jaw chuck, having adjustable jaws 122 for gripping a hollow interior of a roller cone 10. Jaws 122 are specially profiled to include a cylindrical segment shaped journal land 124, which contacts journal race 40 on roller cone 10, providing highly secure attachment of roller cone 10 on chuck 120 of robot 100. A seal relief 128 is provided to accommodate a seal supporting surface on roller cone 10.

Figure 9:
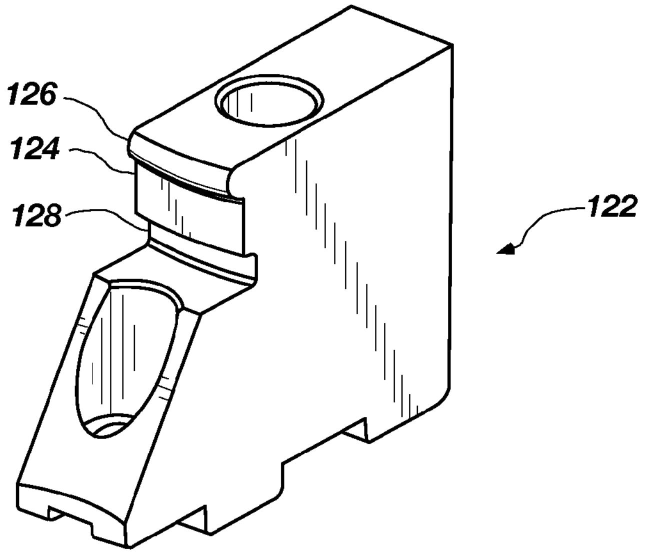
FIG. 9 is an isometric view of a jaw for a three jaw chuck specially profiled to include a journal land and a race land for gripping a rolling cutter.

Illustrated in FIG. 9, a jaw 122 of chuck 120 is specially profiled to include a semi-torus shaped race land 126 above journal land 124. In this configuration, journal land 124 fits in alignment with journal race 40 (see FIG. 2) and race land 126 fits in alignment with ball race 42 (FIG. 2), providing precise alignment against the centerline of ball race 42 and secure attachment of roller cone 10 on chuck 120 of robot 100. Seal relief 128 may be provided to accommodate a seal supporting surface on roller cone 10.

Figure 10:
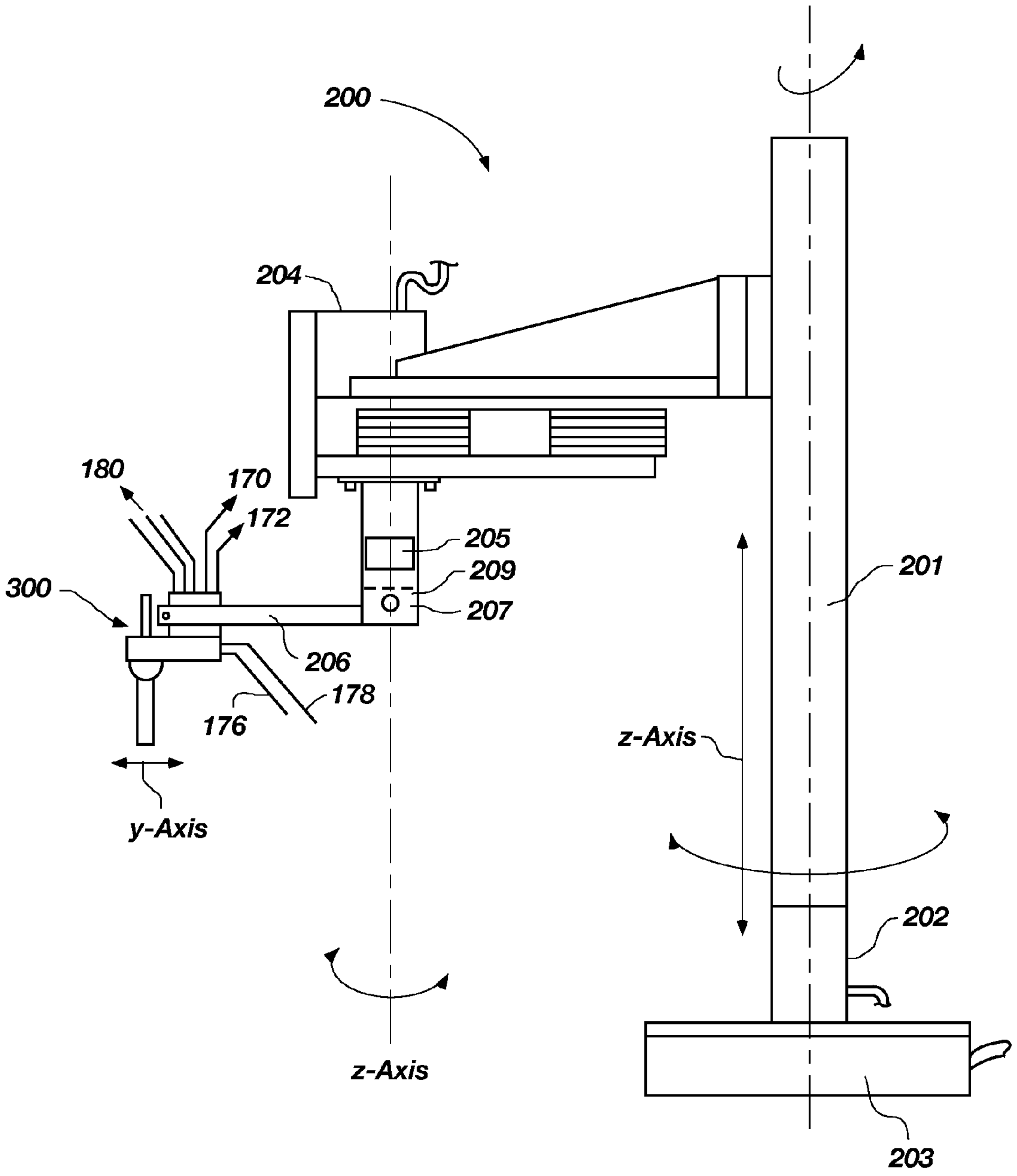
FIG. 10 is a schematic side view of a positioner and a torch.

FIG. 10 is a schematic side view of positioner 200 and torch 300. As illustrated, positioner 200 has a clamp 206 for holding torch 300 in a secure and substantially vertical orientation. Vertical drive 202 provides controlled movement of torch 300 along the z-axis. Drive 203 connected to PLC 150 (FIG. 5) rotates the torch 300 of positioner 200 about the z-axis of the support 201. Drive 205 connected to the PLC 150 rotates torch 300 of positioner 200 about the z-axis of support 207. Drive 209 connected to the PLC 150 rotates torch 300 of positioner 200 about the y-axis of clamp 206. Horizontal drive 204 provides controlled movement of torch 300 along the y-axis. In combination, drives 202 and 204 provide controlled movement of torch 300 on a vertical plane. Drives 202 and 204 are electrically connected to PLC 150.

Drive 204 oscillates torch 300 along the horizontal y-axis in response to PLC 150 for programmed application of a wide-path bead of hardfacing 38 on the surface of teeth 20 of roller cone 10 (see FIG. 2). Drive 202 moves torch 300 along the vertical z-axis in real-time response to measured changes in the voltage or current between torch 300 and roller cone 10. These occasional real-time distance adjustments maintain the proper energy level of the transferred arc between torch 300 and roller cone 10.

Gas dispensing system 180 is connected by piping or tubing to torch 300 for the delivery of transport gas, plasma gas and shielding gas. Hardfacing powder is delivered to torch 300 within the stream of flowing transport gas which receives the hardfacing powder from powder dosage system 160 (see FIGS. 5 and 5A). Torch 300 is electrically connected to pilot arc power source 170 and main arc power source 172.

Figure 11:
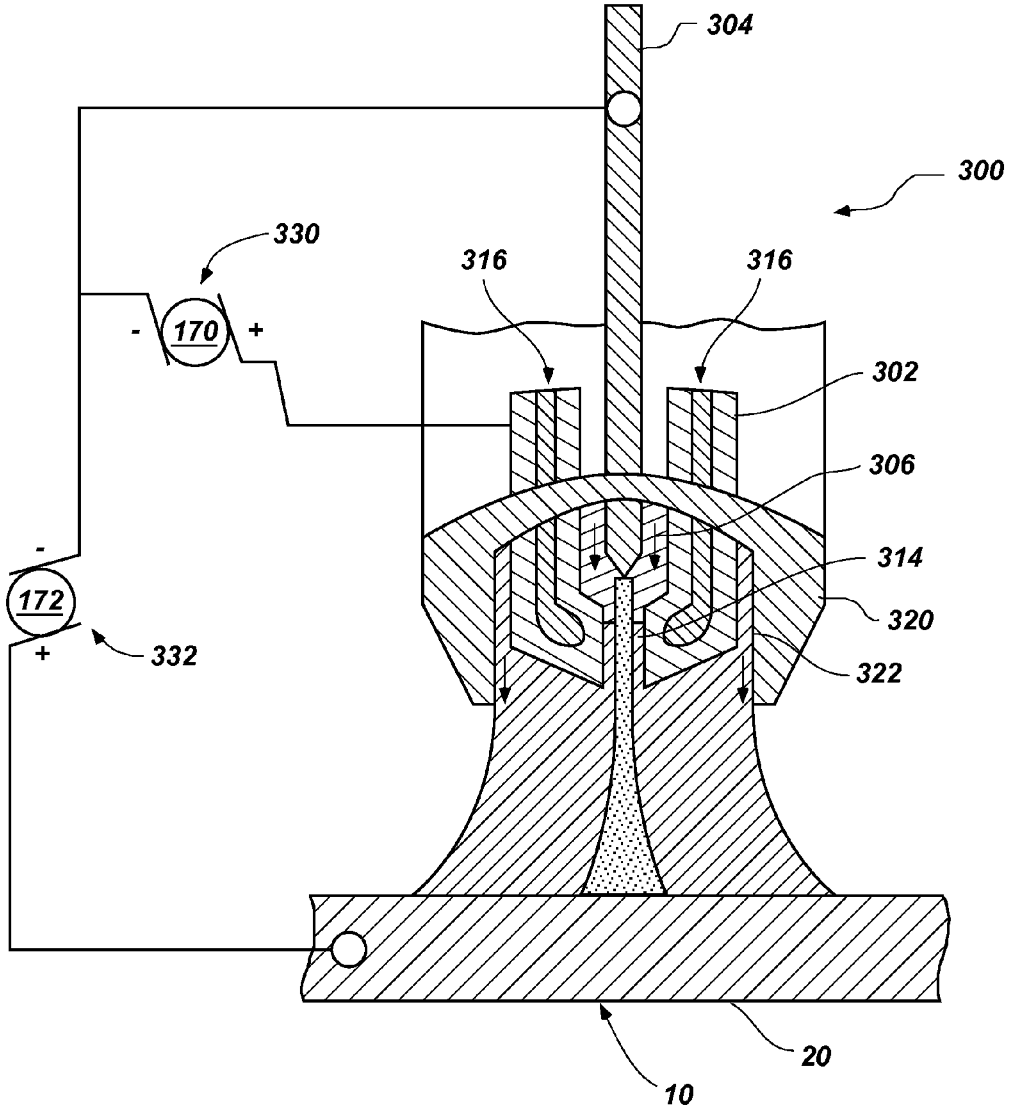
FIG. 11 is a schematic cross-section of the torch shown in FIG. 10.

FIG. 11 is a schematic cross-section of torch 300. Torch 300 has a nozzle 302 that comprises a Plasma Transferred Arc (PTA) torch. A non-burning tungsten electrode (cathode) 304 is centered in nozzle 302 and a nozzle annulus 306 is formed between nozzle 302 and electrode 304. Nozzle annulus 306 is connected to plasma gas source 186 (FIG. 5) to allow the flow of plasma between nozzle 302 and electrode 304. A restricted orifice 314 accelerates the flow of plasma gas exiting nozzle 302. In this embodiment, nozzle annulus 306 is connected to powder dosage system 160 (not shown), which supplies hardfacing powder carried by transport gas to nozzle annulus 306.

Electrode 304 is electrically insulated from nozzle 302. A pilot arc circuit 330 is electrically connected to pilot arc power source 170 (FIG. 5), and electrically connects nozzle 302 to electrode 304. A main arc circuit 332 is electrically connected to main arc power source 172 (FIG. 5), and electrically connects electrode 304 to the anode work piece, roller cone 10. An insulator separates pilot arc circuit 330 and main arc circuit 332. A cooling channel 316 is provided in nozzle 302 for connection to a pair of conduits 176, 178 that circulate cooling fluid from cooling unit 174 (FIGS. 5 and 5A).

A gas cup 320 surrounds nozzle 302. Nozzle 302 is electrically insulated from gas cup 320. A cup annulus 322 is formed between gas cup 320 and nozzle 302. Cup annulus 322 is connected to shielding gas source 190 (see FIG. 5) to allow the flow of shielding gas between gas cup 320 and nozzle 302.

A small, non-transferred pilot arc burns between non-melting (non-consumable) tungsten electrode 304 (cathode) and nozzle 302 (anode). A transferred arc burns between electrode 304 (cathode) and roller cone 10 (anode). Electrode 304 is the negative pole and roller cone 10 is the positive pole. Pilot arc circuit 330 is ignited to reduce the resistance to an arc jumping between roller cone 10 and electrode 304 when voltage is applied to main arc circuit 332. A ceramic insulator separates circuits 330 and 332.

Plasma Transferred Arc (PTA) welding is similar to Tungsten Inert Gas (TIG) welding. Torch 300 is supplied with plasma gas, shielding gas, and transport gas, as well as hardfacing powder. Plasma gas from plasma gas source 186 (see FIG. 5) is delivered through nozzle 302 to electrode 304. The plasma gas exits nozzle 302 through orifice 314. When amperage from main arc circuit 332 is applied to electrode 304, the jet created from exiting plasma gas turns into plasma. Plasma gas source 186 is comprised of 99.9% argon.

Shielding gas from shielding gas source 190 (see FIG. 5) is delivered to cup annulus 322. As the shielding gas exits cup annulus 322 it is directed toward the work piece, roller cone 10. The shielding gas forms a cylindrical curtain surrounding the plasma column, and shields the generated weld puddle from oxygen and other chemically active gases in the air. Shielding gas source 190 is 95% argon and 5% hydrogen.

Transport gas source 182 is connected to powder dosage system 160, as shown in FIGS. 5 and 5A. Powder dosage system 160 meters hardfacing powder through a conduit connected to nozzle 302 at the proper rate for deposit. The transport gas from transport gas source 182 carries the metered powder to nozzle 302 and to the weld deposit on roller cone 10.

Figure 12:
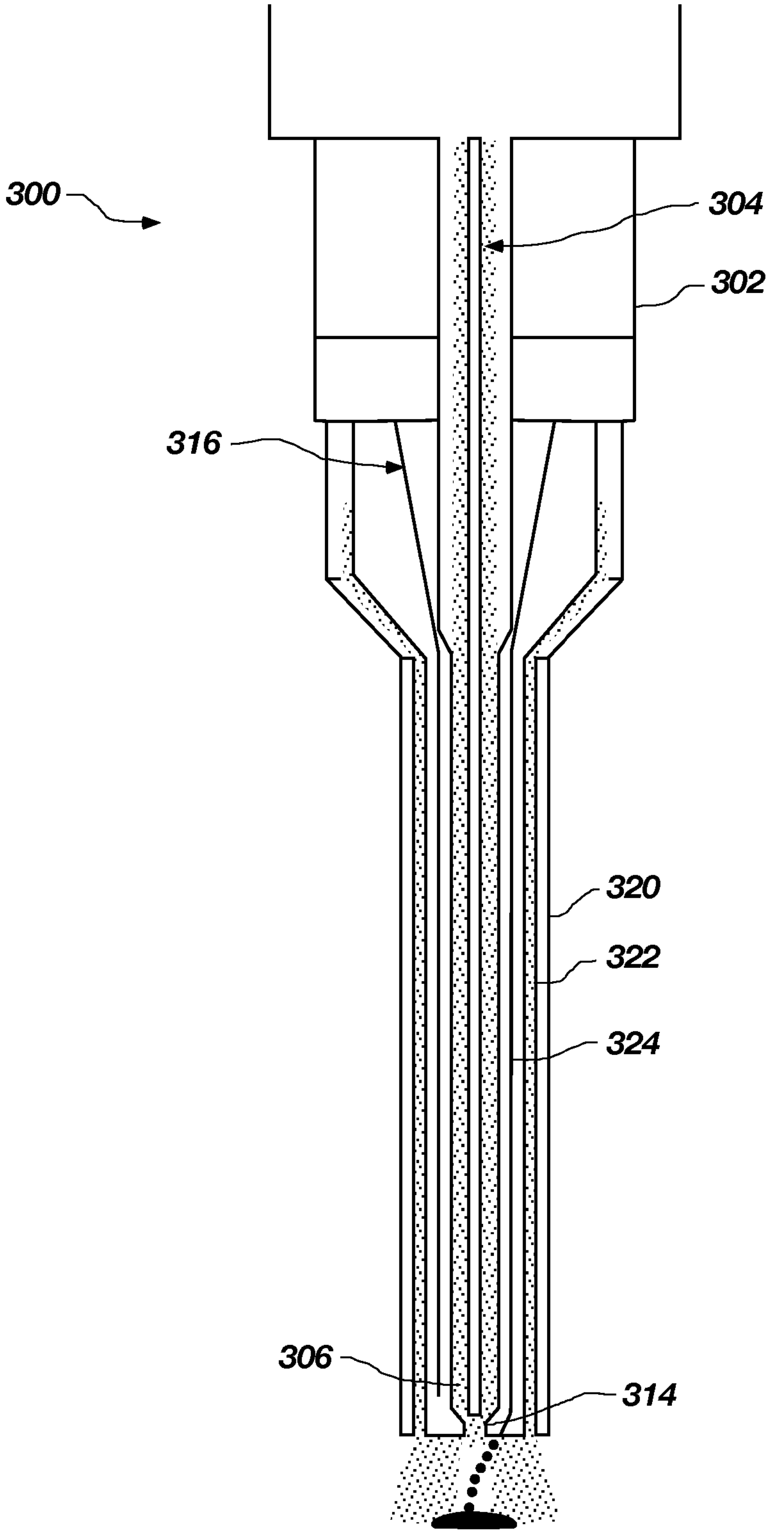
FIG. 12 is a cross-section of a torch configured in accordance with a preferred embodiment.

FIG. 12 is a cross-section of torch 300 wherein gas cup 320 of torch 300 has a diameter of less than 0.640 inch and a length of less than 4.40 inches. Nozzle 302 (anode) of torch 300 is made of copper and is liquid cooled. One such torch that is commercially available is the Eutectic E52 torch available from Castolin Eutectic Group, Gutenbergstrasse 10, 65830 Kriftel, Germany.

Gas cup 320 is modified from commercially available gas cups for use with torch 300 in that gas cup 320 extends beyond nozzle 302 by no more than approximately 0.020 inch. As such, gas cup 320 has an overall length of approximately 4.375 inches. As seen in the embodiment, transport gas and powder are delivered through a transport gas port 324 in nozzle 302. An insulating material is attached to the exterior of gas cup 320 of the torch 300 for helping to prevent short-circuiting and damage to torch 300.

The shielding of gas cup 320 described above is specially designed to improve shield gas coverage of the melt puddle for reducing the porosity thereof. This permits changing the orientation of gas cup 320 to nozzle (anode) 302 and reduction of shielding gas flow velocity. This combination significantly reduces porosity that results from attempts to use presently available commercial equipment to robotically apply hardfacing 38 to steel-tooth roller cones 10.

OPERATION

Some of the problems encountered in the development of robotic hardfacing included interference between the torch and teeth on the roller cone, short circuiting the torch, inconsistent powder flow, unsustainable plasma column, unstable puddle, heat buildup when using conventional welding parameters, overheated weld deposits, inconsistent weld deposits, miss-shaping of teeth, and other issues. As a result, extensive experimentation was required to reduce the present invention to practice.

As described herein, the system and method of the present invention begins with inverting what has been the conventional practice of roller cones. That is, the practice of maintaining roller cone 10 generally stationary and moving torch 300 all over it at various angles as necessary. Fundamental to the system and method of the present invention, torch 300 is preferably held substantially vertical, although it may be held at any angle or attitude desired through the use of a positioner 200 or robotic arm 100, while roller cone 10 is held by chuck 120 of robotic arm 104 and manipulated beneath torch 300. If torch 300 is robotically manipulated by positioner 200 or robotic arm 104 in varying and high angular positions relative to vertical, hardfacing powder in torch 300 will flow unevenly and cause torch 300 to become plugged. In addition to plugging torch 300, even flow of hardfacing powder is critical to obtaining a consistent quality bead of hardfacing material on roller cone 10. Thus, deviation from a substantially vertical orientation is avoided. Although, if plugging of torch 300 is not a problem with the particular hardfacing being used, the torch 300 may be oriented at any desired position.

As the terms are used in this specification and claims, the words “generally” and “substantially” are used as descriptors of approximation, and not words of magnitude. Thus, they are to be interpreted as meaning “largely but not necessarily entirely.”

Accordingly, a roller cone 10 is secured to distal end 106 of robot arm 104 by chuck 120 and adapter 110. Roller cone 10 is grounded by ground cable 114 which is attached to adapter 110 at ground connector 112. Providing an electrical ground source near distal end 106 of robot arm 104 of robot 100 is necessary, since using robot 100 in the role-reversed manner of the present invention (holding the anode work piece) would otherwise result in destruction of the robot 100 by arc welding the rotating components of the movable axes together.

Robot arm 104 moves in response to program control from robot controller 130 and/or PLC 150. As stated, torch 300 is mounted to positioner 200 having two controllable axes in a substantially vertical plane. As previously mentioned, a physical indicator, such as a notch or groove, may be formed on roller cone 10 to be engaged by torch 300 to ensure proper initial orientation between torch 300, robot arm 104, and roller cone 10. Additionally, at least one position indicator is electrically connected to PLC 150 for determining location and orientation of roller cone 10 to be hardfaced relative to robot 100.

After initial orientation and positioning, transfer, plasma and shielding gases are supplied to torch 300 by their respective sources 182, 186, 190, through their respective controllers 184, 188, 192.

Torch 300 is ignited by provision of current from pilot arc power source 170 and main arc power source 172. Igniting pilot arc circuit 330 reduces the resistance to an arc jumping between roller cone 10 and electrode 304 when voltage is applied to main arc circuit 332.

Flow of hardfacing powder is provided by powder dosage system 160 dispensing controlled amounts of hardfacing powder into a conduit of flowing transport gas from transport gas source 182, having a flow rate controlled by flow controller 184. Then relative movement, primarily of roller cone 10 relative to torch 300, as described above and below is obtained by movement of robot arm 104 and positioner 200, permitting automated application of hardfacing 38 to the various selected surfaces of roller cone 10 in response to programming from robot controller 130 and PLC 150.

An imaging sensor 142 may be provided for identifying specific roller cones 10 and/or parts of roller cones 10 to be hardfaced. A laser sensor 142 (FIG. 5) may also provided for determining proximity of torch 300 to roller cone 10 and tooth 20, and/or to measure thickness of applied hardfacing 38. Positioning and other programming parameters are correctable based on sensor 142 data acquisition and processing.

Robot controller 130 is primarily responsible for control of robot arm 104, while PLC 150 and data recording device 195 provide sensor 142 data collection and processing, data analysis and process adjustment, adjustments in robot 100 movement, torch 300 oscillation, and torch 300 operation, including power, gas flow rates and material feed rates.

Figure 13:
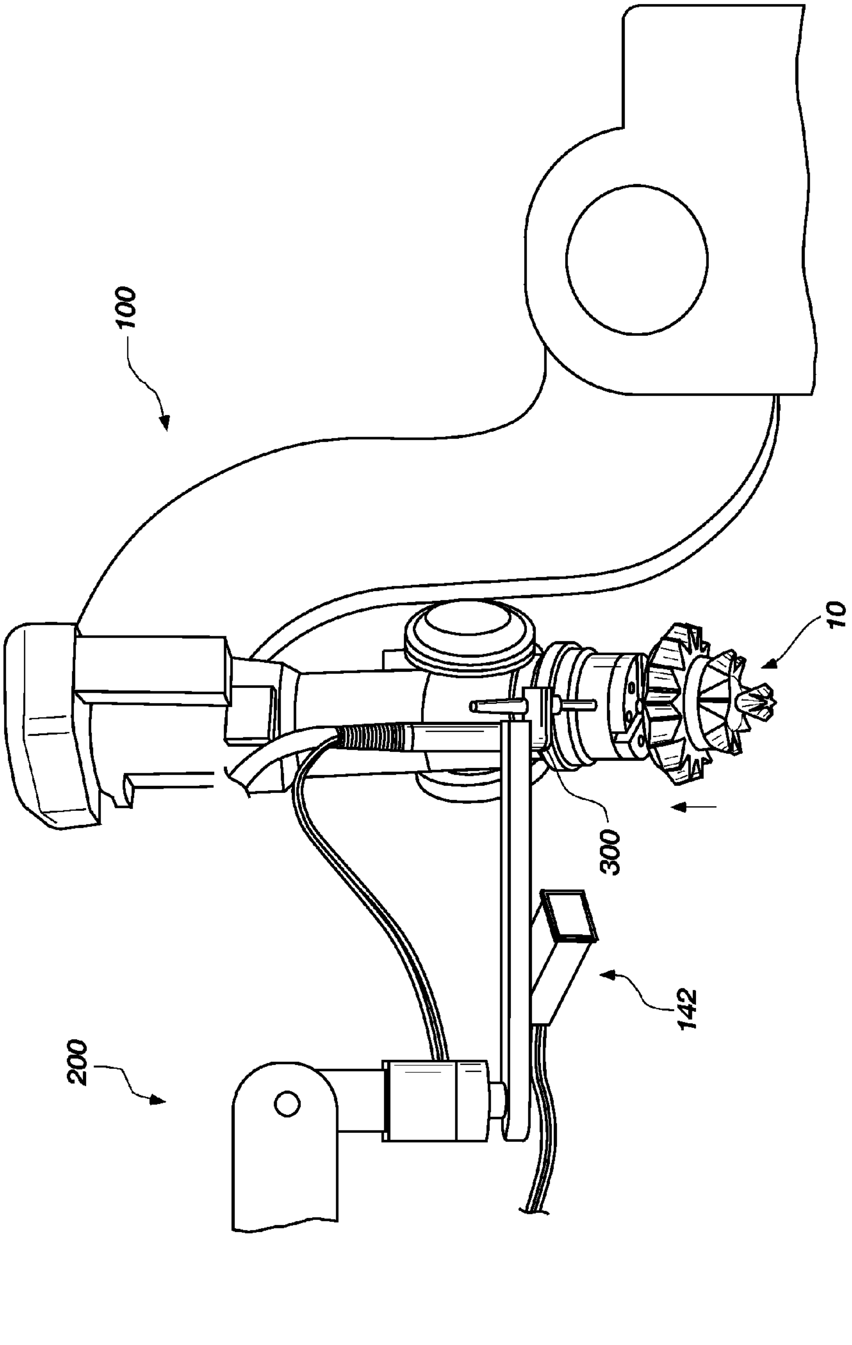
FIG. 13 is an isometric view illustrating a robot manipulating a rolling cutter into position in preparation of the application of hardfacing to outer ends of the teeth.
Figure 13A:
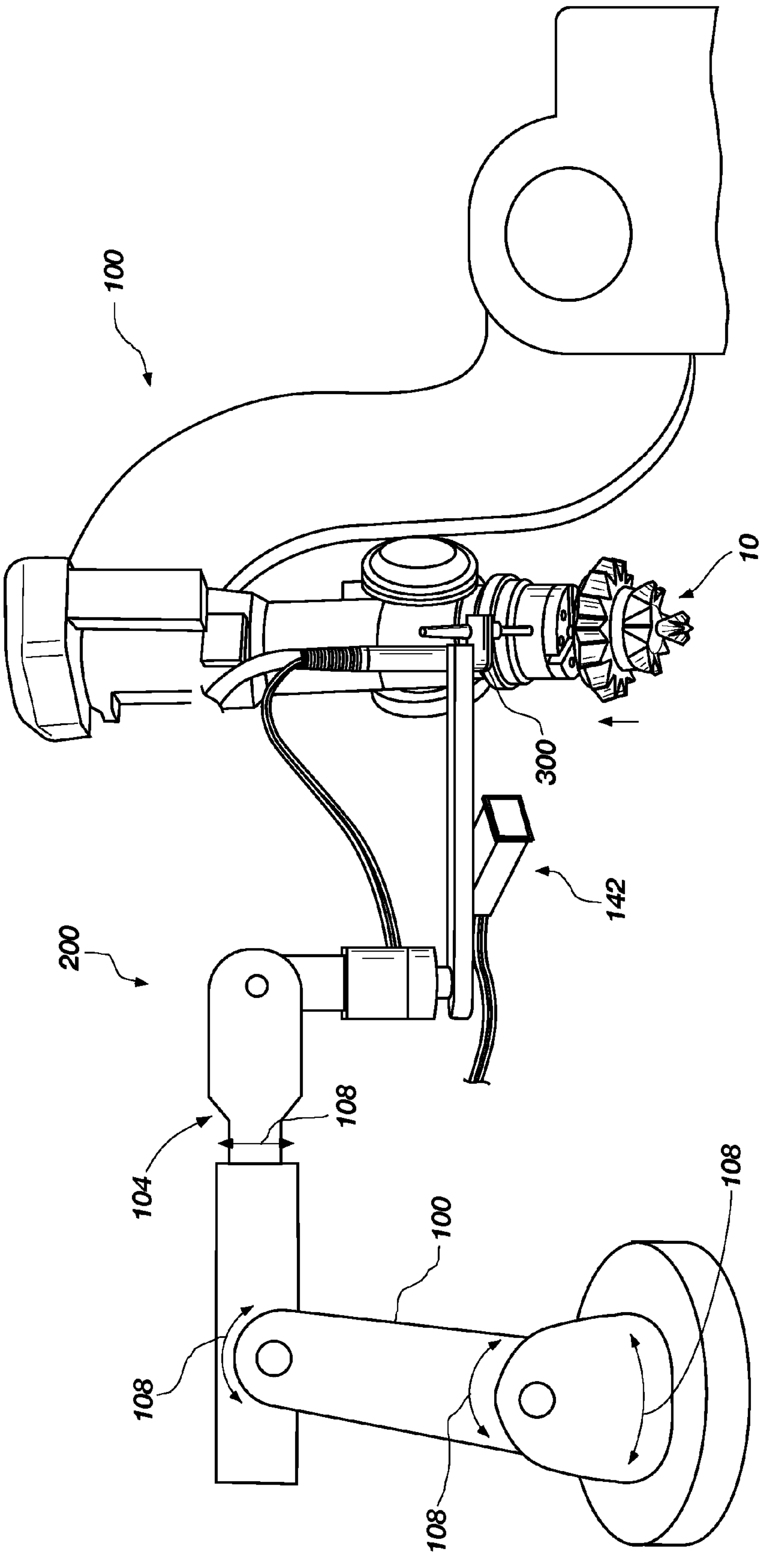
FIG. 13A is an isometric view illustrating a robot manipulating a torch and a robot manipulating a rolling cutter into position in preparation of the application of hardfacing to the outer ends of the teeth.
Figure 14:
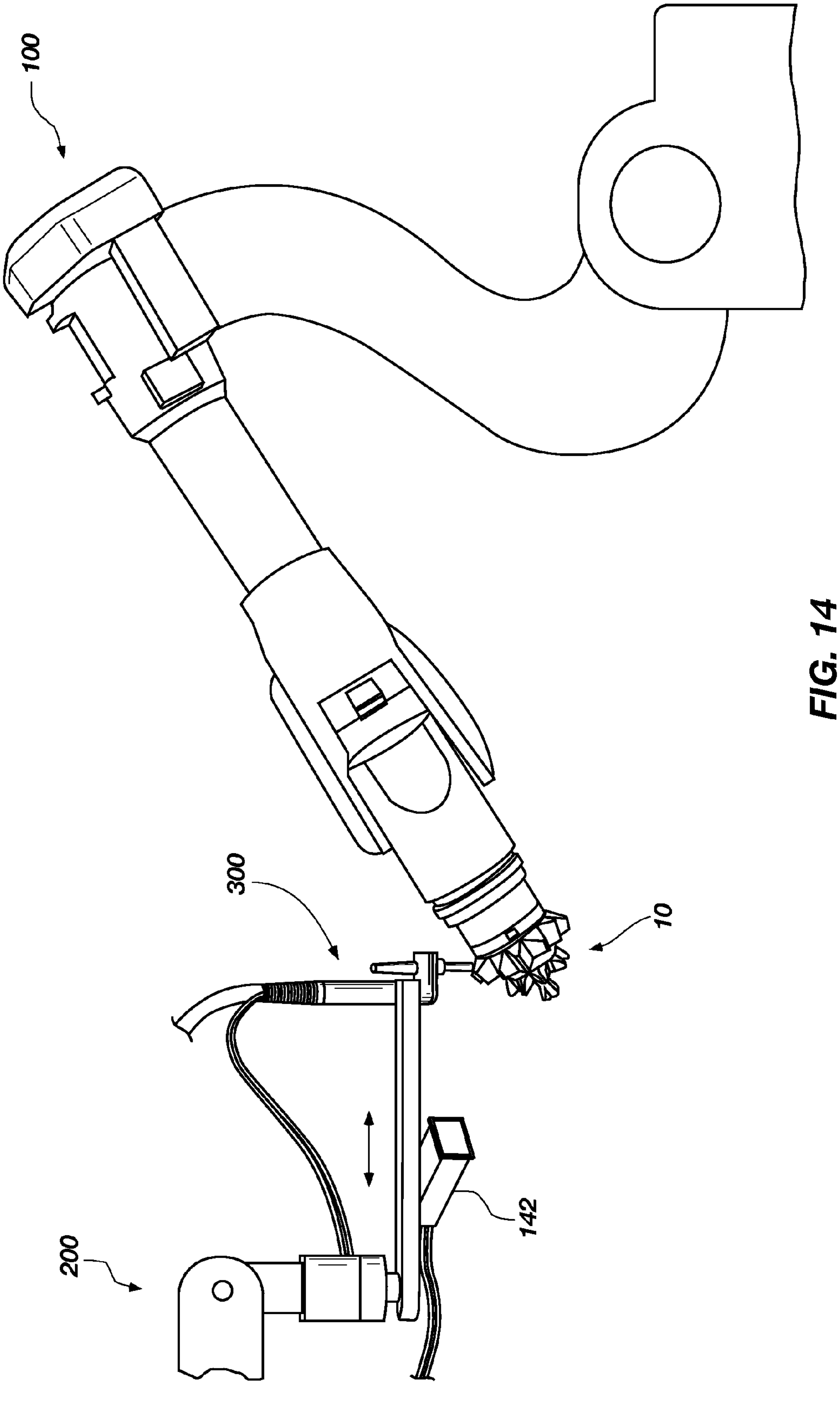
FIG. 14 is a side view illustrating a torch applying hardfacing to the outer end of a tooth on an outer row of the cutter.
Figure 15:
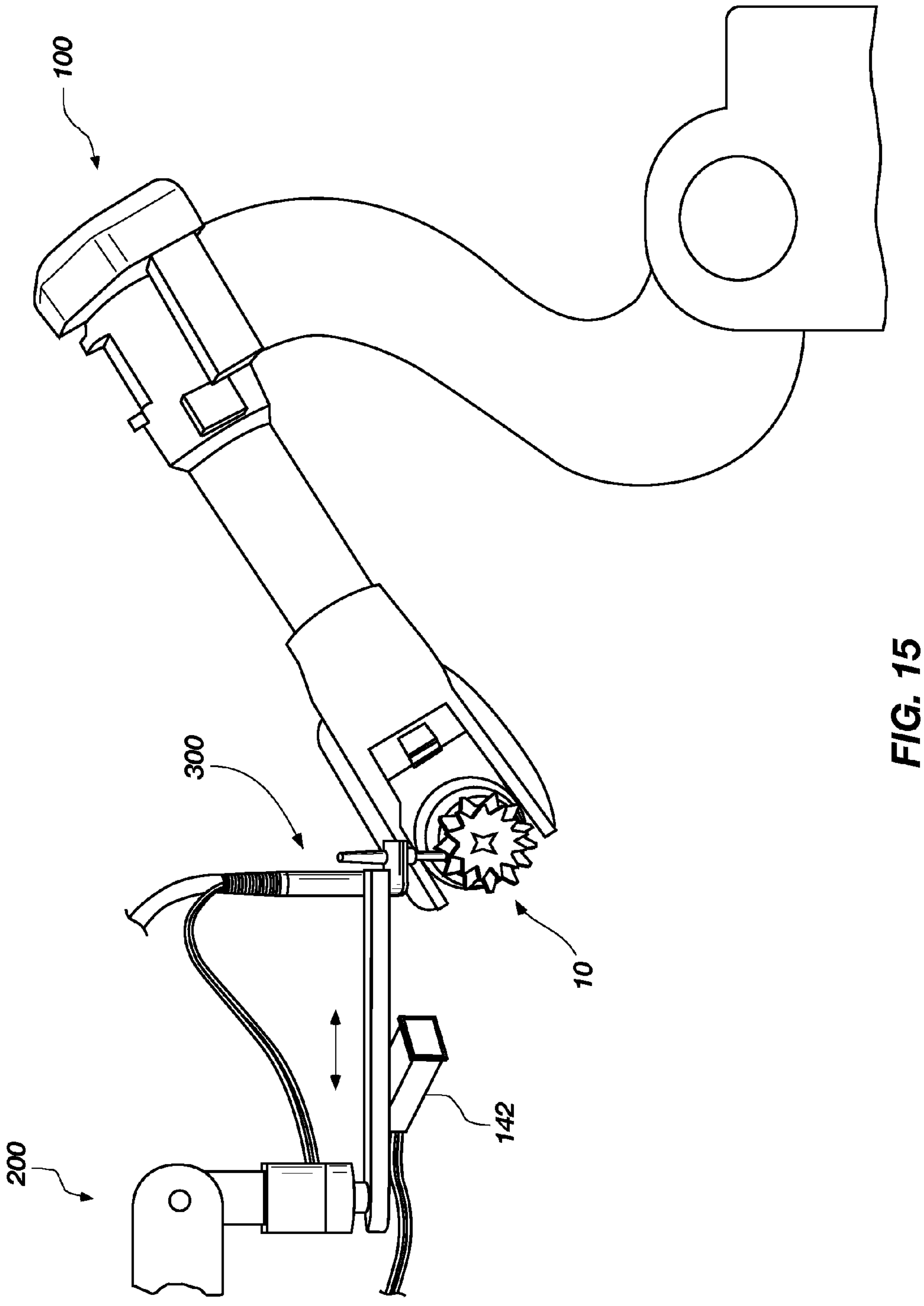
FIG. 15 is a side view illustrating the torch applying hardfacing to a leading flank of a tooth on the outer row of the cutter.
Figure 16:
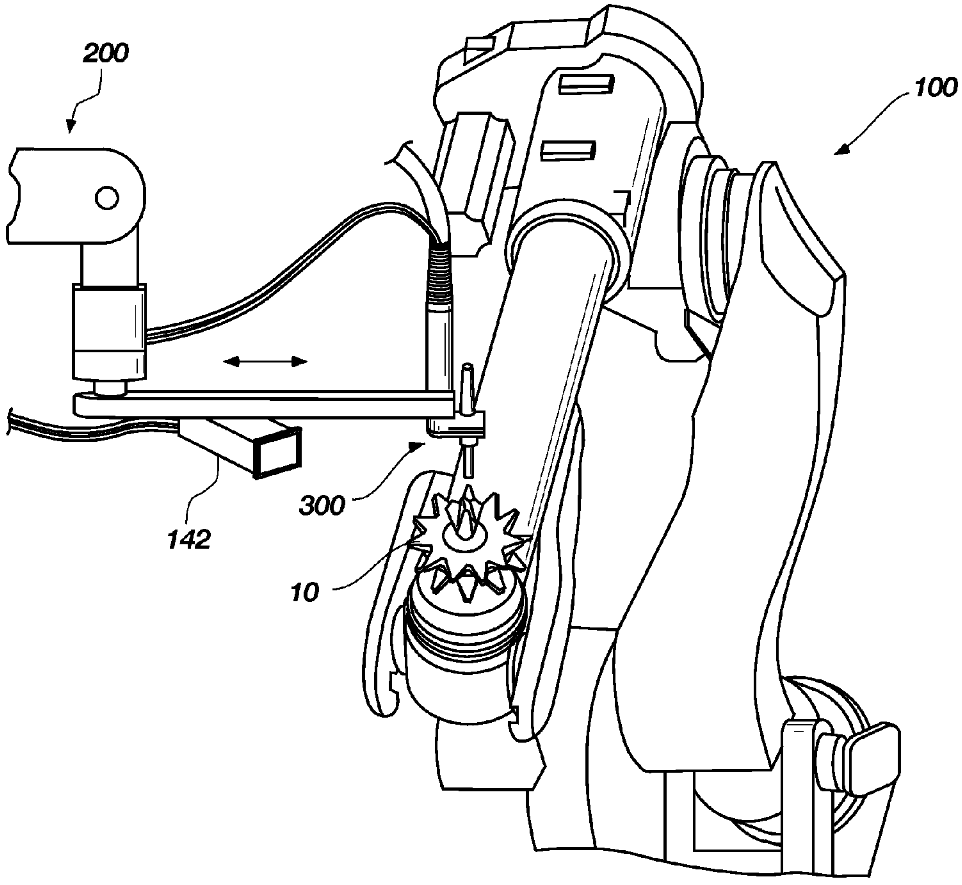
FIG. 16 is an isometric view illustrating a robot manipulating a rolling cutter into position in preparation of the application of hardfacing to the inner end of a tooth on the cutter.

FIGS. 13, 13A, and 14 illustrate robot 100 manipulating roller cone 10 into position to apply hardfacing material to outer end 28 (see FIG. 3) of teeth 20 (see FIGS. 2-4) on outer row 16 of roller cone 10 (see FIG. 2). FIG. 15 illustrates torch 300 in position to apply hardfacing to leading flank 22 or trailing flank 24 (see FIG. 3) of tooth 20 (see FIGS. 2-4) on outer row 16 (see FIG. 16) of roller cone 10 (see FIG. 2). FIG. 16 is an isometric view illustrating robot 100 manipulating roller cone 10 (see FIG. 2) into position in preparation for application of hardfacing 38 (see FIG. 4) to inner end 30 (see FIG. 3) of tooth 20 (see FIGS. 2-4).

As can be seen in FIG. 6 and in FIGS. 13-16, several axes of rotation 108 of robot arm 100 provide sufficient degrees of freedom to permit vertical, horizontal, inverted, and rotated positioning of roller cone 10 beneath torch 300, allowing torch 300 to access the various surfaces of roller cone 10 while maintaining torch 300 in a substantially vertical position. In addition to providing a system and apparatus that addresses the realities of automated application of hardfacing to the complex surfaces of roller cones, the present invention provides a system and method or pattern of application of the hardfacing material to the cutters that is adapted to take advantage of the precisely controlled relative movement between torch 300 and roller cone 10 made possible by the apparatus of the present invention. These patterns will be described with reference to FIGS. 17 through 25 below.

The above-described system and method of the present invention has resolved these issues and enabled development of the method of applying hardfacing of the present invention. The present invention includes a hardfacing pattern created by superimposing a first waveform path onto a second waveform path.

Figure 17:
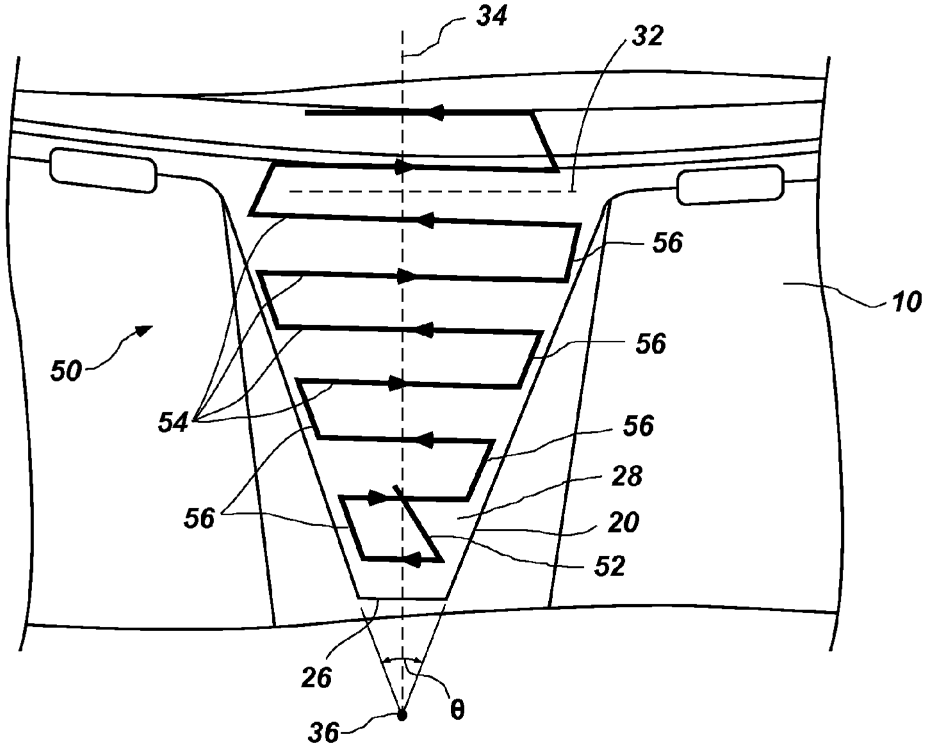
FIG. 17 is a bottom view of a typical steel-tooth such as might be located on the steel-tooth cutter of FIG. 2, illustrating a substantially trapezoidal waveform target path for hardfacing in accordance with a preferred embodiment of the present invention.

FIG. 17 is a bottom view of a typical steel-tooth 20, such as might be located on roller cone 10, illustrating a first waveform target path 50 defined in accordance with the present invention. Tooth 20 has an actual or approximate included angle θ. Vertex 36 of included angle θ lies on centerline 34 of tooth 20. Centerline 34 extends through crest 26 and base 32.

As illustrated, target path 50 traverses one surface of tooth 20. By way of example, outer end surface 28 is shown, but applies to any and all surfaces of tooth 20. Target path 50 has numerous features. Target path 50 may begin with a strike path 52 located near crest 26. The various surfaces of teeth 20 are preferably welded from nearest crest 26 toward base 32, when possible, to control heat buildup.

Thereafter, target path 50 traverses the surface of tooth 20 in parallel paths while progressing in the direction of base 32. Target path 50 is comprised of traversing paths 54, which cross centerline 34, are alternating in direction, and generally parallel to crest 26.

Step paths 56 connect traversing paths 54 to form a continuous target path 50. Step paths 56 are not reversing, but progressing in the direction of base 32. Step paths 56 are preferably generally parallel to the sides of the surface being hardfaced. As such, step paths 56 are disposed at an angle of approximately θ/2 to centerline 34. Taken together, traversing paths 54 and step paths 56 form target path 50 as a stationary, generally trapezoidal waveform about centerline 34, having an increasing amplitude in the direction of base 32.

The amperage of torch 300 is applied in proportion to the length of traversing path 54. This permits generation of a good quality bead definition in hardfacing 38. This is obtained by starting at the lowest amperage on traversing path 54 nearest to crest 26 of tooth 20, and increasing the amperage in proportion to the length of traversing path 54 where hardfacing 38 is being applied.

Alternatively, amperage and powder flow are increased as hardfacing 38 is applied to crest 26. This results in increased height of the automatically welded crests 26 to their total design height. The programmed traversing paths 54 for flanks 22 and 24, inner surface 30 and outer surface 28 (see FIG. 3) are also modified such that to overlap crests 26 sufficiently to create the desired profile and to provide sufficient support to crests 26.

The program sequence welds the surface of a datum tooth, then offsets around the roller cone axis the amount needed to align with the next tooth surface. Also, teeth are welded from the tip to the root to enhance heat transfer from the tooth and prevent heat buildup. Welding is alternated between rows of teeth on the roller cone to reduce heat buildup.

Figure 18:
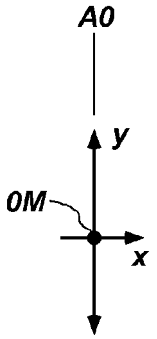
FIG. 18 is a schematic representation of oscillation of the torch on an axis of an oscillation "AO" having an oscillation midpoint "OM" in accordance with a preferred embodiment of the present invention.

FIG. 18 is a schematic representation of the oscillation of torch 300. In this illustration, x-y defines a horizontal plane. Torch 300 is movable in the z-y vertical plane perpendicular to the x-y plane. The y-axis is the axis of oscillation ("AO"). Torch 300 is oscillated along the AO. The oscillation midpoint is identified as OM. Oscillation of torch 300 is controlled by instructions from programmable logic controller 150 provided to horizontal drive 204 of positioner 200 (see FIG. 5). Torch 300 has a variable linear velocity along its axis of oscillation AO depending upon the characteristics of the roller cone material and the hardfacing being applied.

Figure 19:
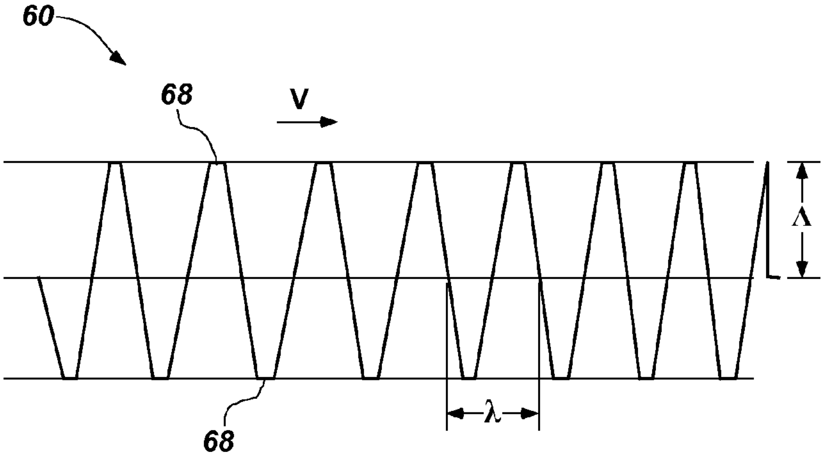
FIG. 19 is a schematic representation of a substantially triangular waveform torch path for hardfacing in accordance with a preferred embodiment of the present invention.

FIG. 19 is a schematic representation of a second waveform torch path 60 formed in accordance with the present invention. Hardfacing is applied to a tooth 20 by oscillating torch 300 while moving roller cone 10 on target path 50 beneath torch 300. In this manner, hardfacing is applied by superimposing the waveform of torch path 60 onto the waveform of target path 50. By superimposing torch path 60 onto target path 50, a superior hardfacing pattern is created. More specifically, the superimposed waveform generates a uniform and continuous hardfacing bead, is properly defined, and efficiently covers the entire surface of tooth 20 with the desired thickness of material and without excessive heat buildup.

As used throughout herein, the terms "waveform," "trapezoidal waveform" and "triangular waveform" are not intended to be construed or interpreted by any resource other than the drawings and description provided herein. More specifically, they are used only as descriptors of the general path shapes to which they have been applied herein.

As seen in FIG. 19, torch path 60 has an amplitude Λ. It is preferred to have a Λ between 3 mm and 5 mm. It is more preferred to have a Λ is about 4 mm. Traversing path 54 (see FIG. 17) is positioned in approximate perpendicular relationship to the axis of torch 300 oscillation, at the oscillation midpoint (OM). The waveform of torch path 60 is formed by oscillating torch 300 while moving roller cone 10 along traversing path 54 (see FIG. 17) beneath the OM of torch 300. Thus, traversing path 54 of target path 50 (see FIG. 17) becomes the axis about which the generally triangular waveform of torch path 60 oscillates.

The torch path 60 has a velocity of propagation $V_t$ of between 1.2 mm and 2.5 mm per second at the intersection of traversing path 54 and OM of torch 300. Roller cone 10 is positioned and moved by instructions from robot controller 130 provided to robot 100. Robot 100 moves roller cone 10 to align target path 50 directly beneath the OM. Roller cone 10 is moved such that the OM progresses along target path 50 at a linear velocity (target path speed) of between 1 mm and 2.5 mm per second.

As illustrated, a momentary dwell period 68 is programmed to elapse between peaks of oscillation of torch 300, wherein dwell period 68 helps prevent generally triangular waveform of torch path 60 from being a true triangular waveform. Preferably, dwell period 68 is between about 0.1 to 0.4 seconds.

Figure 20:
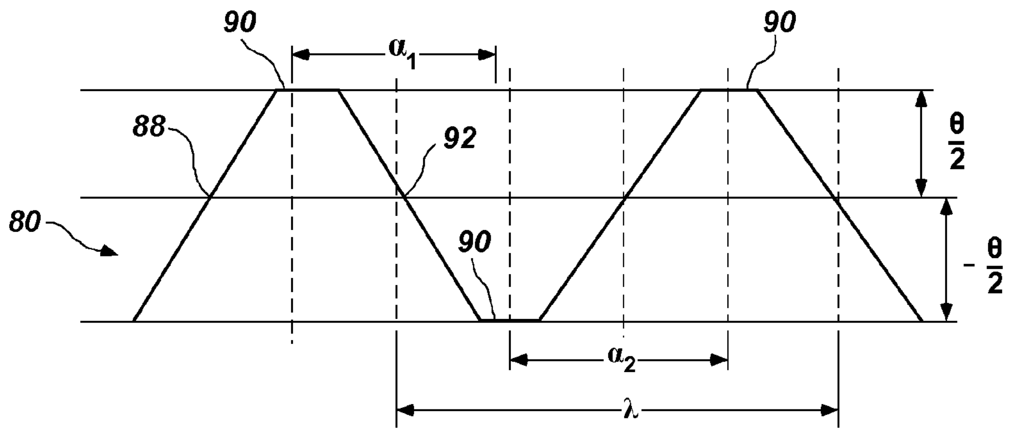
FIG. 20 is a schematic representation of a waveform created by oscillation of a cutter relative to an intersection of a target path and oscillation midpoint "OM" in accordance with a preferred embodiment of the present invention.

FIG. 20 is a schematic representation of the secondary oscillation 80 of traversing path 54 (see FIGS. 17, 21, and 23) modifying torch path 60 (see FIG. 19). Traversing path 54 is oscillated as a function of the location of oscillation midpoint OM on target path 50 (see FIG. 17). Secondary oscillation 80 is created by gradually articulating roller cone 10 between step paths 56 as oscillation midpoint OM of oscillating torch 300 passes over traversing path 54. Each traversing path 54 constitutes ½λ of a wave length of secondary oscillation 80. Since traversing paths 54 are of different lengths, the wavelength of secondary oscillation 80 expands as the hardfacing application progresses towards base 32 of tooth 20. For example, where $\alpha_1$ represents a first traversing path 54 and $\alpha_2$ represents the next traversing path 54, $\alpha_1<\alpha_2$.

Figure 21:
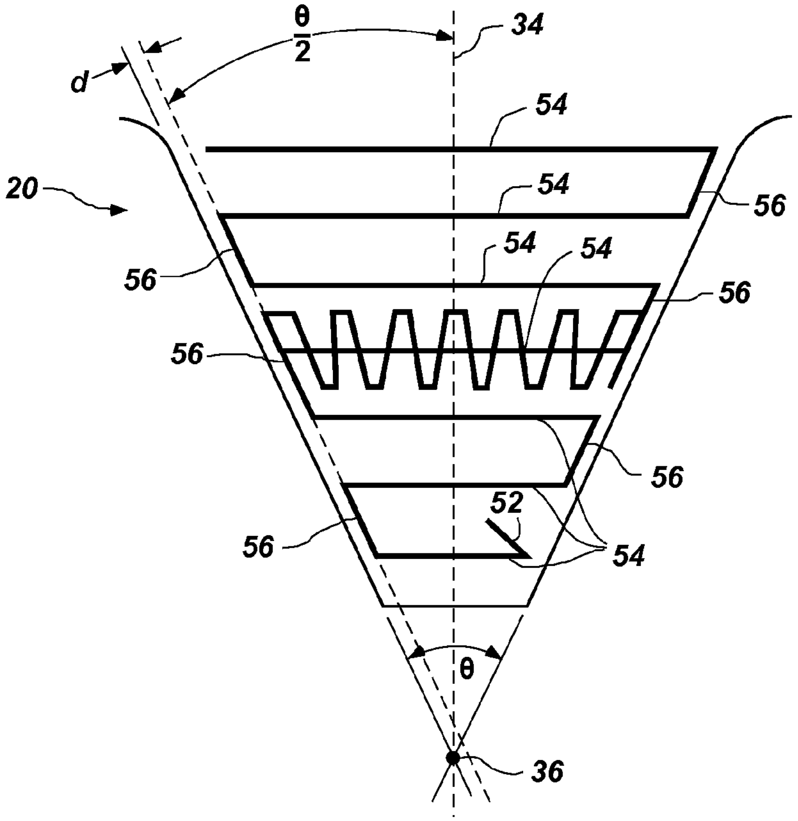
FIG. 21 is a schematic representation of a modified waveform of hardfacing created in accordance with the preferred embodiment of FIG. 20.

FIG. 21 is a bottom view of steel-tooth 20 illustrating traversing paths 54 connected by step paths 56 to form first waveform target path 50. Second waveform torch path 60 is superimposed on target path 50. When secondary oscillation 80 is imparted on traversing path 54, an accordion-like alteration of second waveform torch path 60 results.

Referring to FIG. 20 and FIG. 21, a maximum articulation angle of about |θ/2| of roller cone 10 occurs at each step path 56. In an optional embodiment, as oscillation midpoint OM of torch 300 progresses on each step path 56, secondary oscillation 80 is dwelled. This can be done optionally based on prior path (hardfacing) coverage of step path 56. Point 90 in FIG. 20 schematically represents the dwell periods.

As roller cone 10 moves along traversing path 54, roller cone 10 is gradually articulated by robot 100 until axis of oscillation AO (see FIG. 18) is substantially perpendicular to traversing path 54 at tooth 20 centerline 34. This occurs schematically at point 88 on FIG. 20. As roller cone 10 continues to move along traversing path 54, roller cone 10 is gradually articulated by robot 100 until step path 56 is again parallel to axis of oscillation AO. This occurs when oscillation midpoint OM arrives at a subsequent step path 56. At that point, maximum articulation of θ/2 has been imparted to roller cone 10. Oscillation is dwelled at point 90 until oscillation midpoint OM arrives at subsequent traversing path 54. Roller cone 10 is then gradually articulated back by robot 100 until traversing path 54 is again perpendicular to axis of oscillation AO at tooth centerline 34. This occurs at point 92 in FIG. 20.

Secondary oscillation of roller cone 10 continues until subsequent step path 56 is parallel to axis of oscillation AO, when oscillation midpoint OM arrives at subsequent step path 56. At that point, a maximum articulation of −θ/2 has been imparted to roller cone 10. Oscillation is again dwelled at point 90 until oscillation midpoint OM arrives at subsequent traversing path 54.

Figure 24:
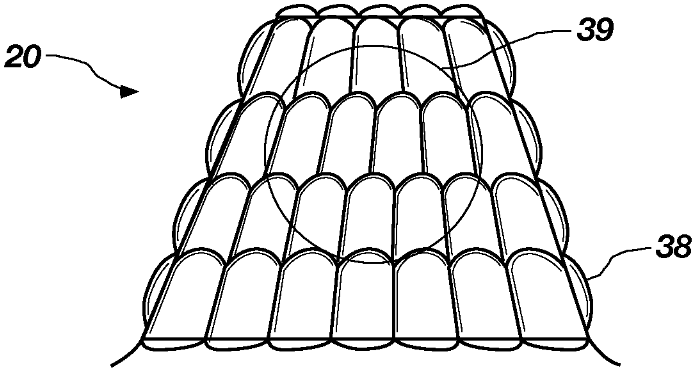
FIG. 24 is a schematic representation of a "shingle" pattern of hardfacing applied to a tooth of a cutter, in accordance with a preferred embodiment of the present invention.

Robot 100 rotates roller cone 10 a maximum of angle θ/2 at the intersection of traversing path 54 and step path 56, such that step path 56 and the approaching edge of tooth 20 are oriented generally parallel to axis of oscillation AO of torch 300. The waveform of torch path 60 is thus substantially modified as torch 300 approaches each step path 56. The application result is a very efficient and tough "shingle" pattern 39 of hardfacing 38 near tooth 20 centerline 34. FIG. 24 is a schematic representation of "shingle" pattern 39.

Optionally, oscillation of roller cone 10 may be dwelled when oscillation midpoint OM is near centerline 34 of tooth 20 to obtain a more uniform bead deposition across the width of tooth 20. In the preferred embodiment, step paths 56 are slightly offset from the edge of tooth 20 by a distance d.

The path speed of step path 56 may be higher than the path speed of traversing path 54, such that the amount of hardfacing deposited is controlled to provide the desired edge protection for tooth 20. It is preferred to have the length of step path 56 is greater than height Λ, and less than 2Λ. Preferably, step path 56 is approximately 5 mm. Thus, hardfacing deposited on two adjacent traversing paths 54 will overlap. Preferably, the length of overlap is about 3 mm. Generating this overlap creates a smooth surface with no crack-like defects.

Roller cone 10 may be preheated to prevent heat induced stress. When necessary, portions of the welds can be interrupted during processing to minimize and control heat buildup. Preferably, crests 26 are formed in three interrupted passes, in which the interruption provides cooling and shape stabilization of the applied material from the previous pass.

Figure 22:
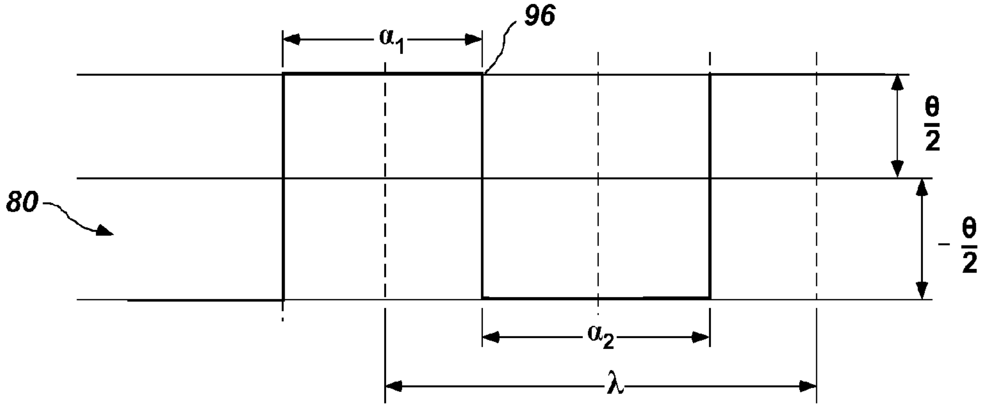
FIG. 22 is a schematic representation of a generally rectangular shaped waveform created by oscillation of a cutter relative to an intersection of a target path and oscillation midpoint "OM" in accordance with a preferred embodiment of the present invention.

FIG. 22 is a schematic representation of another embodiment of the system and method of the present invention wherein secondary oscillation 80 of traversing path 54 (see FIGS. 17, 21, and 23) again modifies torch path 60 (see FIG. 19). However, in this embodiment, secondary oscillation 80 is created by relatively sudden and complete articulation of roller cone 10 at step paths 56 as oscillation midpoint OM of oscillating torch 300 reaches, or nearly reaches, step path 56 (see FIGS. 17, 21, and 23). Each traversing path 54 (see FIGS. 17, 21, and 23) constitutes ½λ of a wavelength of secondary oscillation 80. Since traversing paths 54 (see FIGS. 17, 21, and 23) are of different lengths, the wavelength of secondary oscillation 80 expands as the hardfacing application progresses towards base 32 of tooth 20. For example, where $\alpha_1$ represents a first traversing path 54 (see FIGS. 17, 21, and 23) and $\alpha_2$ represents the next traversing path 54, $\alpha_1<\alpha_2$.

Figure 23:
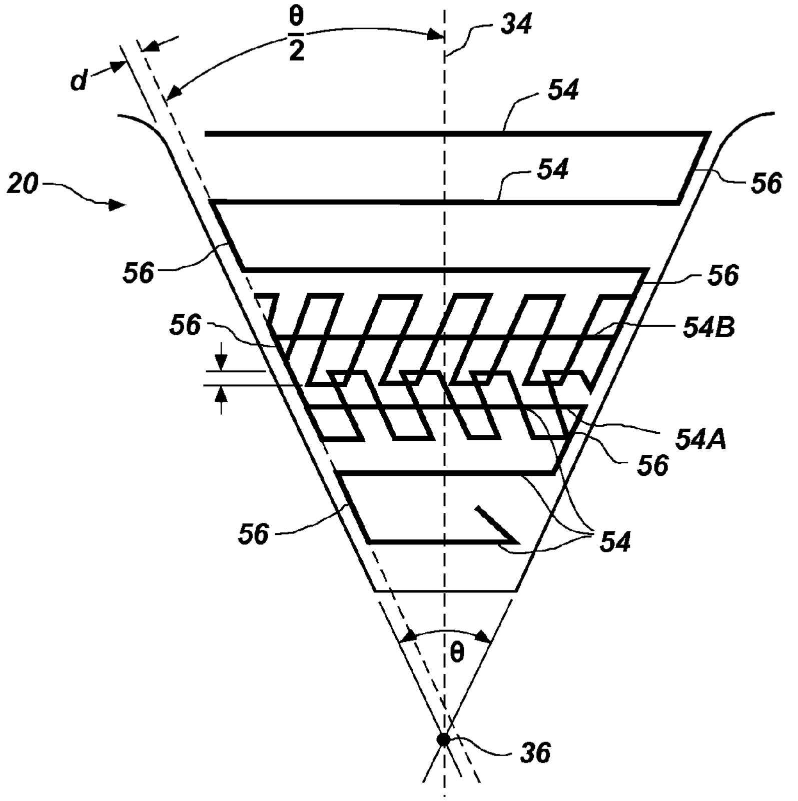
FIG. 23 is a schematic representation of a modified waveform of hardfacing created in accordance with the preferred embodiment of FIG. 22.

FIG. 23 is a bottom view of steel-tooth 20 illustrating traversing paths 54 connected by step paths 56 (see FIGS. 17, 21, and 23) to form first waveform target path 50 (see FIG. 17). Second waveform torch path 60 (see FIG. 19) is superimposed on target path 50 (see FIG. 17). When secondary oscillation 80 is imparted on traversing paths 54 (see FIGS. 17, 21, and 23), a herringbone pattern of hardfacing 38 is produced on the surface of tooth 20.

Referring to FIG. 22 and FIG. 23, a maximum articulation angle of about |θ/2| of roller cone 10 occurs at each step path 56 (as measured from the centerline 34 of tooth 20). In this embodiment, as oscillation midpoint OM of torch 300 progresses on each step path 56, secondary oscillation 80 is dwelled. The dwell periods are schematically represented by the high and low points of secondary oscillation 80 in FIG. 22.

As roller cone 10 moves along traversing path 54, it is not again articulated by robot 100 until oscillation midpoint OM of torch 300 nears or reaches the subsequent step path 56. This occurs schematically at point 96 on FIG. 22. At this point, roller cone 10 is articulated by robot 100 an angular amount θ, aligning subsequent step path 56 substantially parallel to axis of oscillation AO.

Figure 25:
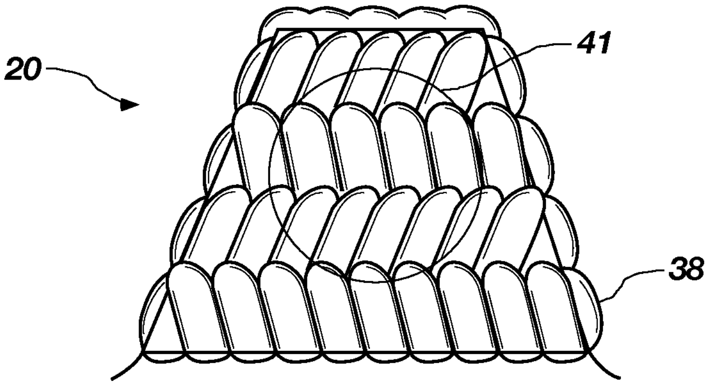
FIG. 25 is a schematic representation of a "herringbone" pattern of hardfacing applied to a tooth of a cutter, in accordance with a preferred embodiment of the present invention.

A traversing row 54A will comprise the centerline of a series of parallel columns of hardfacing 38 inclined at an angle to centerline 34 of tooth 20. As illustrated, the angle is approximately θ/2. Additionally, traversing row 54A will have an adjacent traversing row 54B comprising the centerline of a series of parallel columns of hardfacing 38, inclined at an angle to centerline 34 of tooth 20, where the angle is approximately −(θ/2). Still, the hardfacing 38 of traversing row 54A and the hardfacing of traversing row 54B will overlap. The application result is a very efficient and tough "herringbone" pattern 41 of hardfacing 38 near tooth 20 centerline 34. FIG. 25 is a schematic representation of "herringbone" pattern 41.

As an alternative, a scooped tooth 20 configuration is obtained by welding crest 26 in two passes. The first pass adds height. When the second pass is made without pausing, hardfacing 38 applied to crest 26 adds width and laps over to the desired side.

Figure 26A:
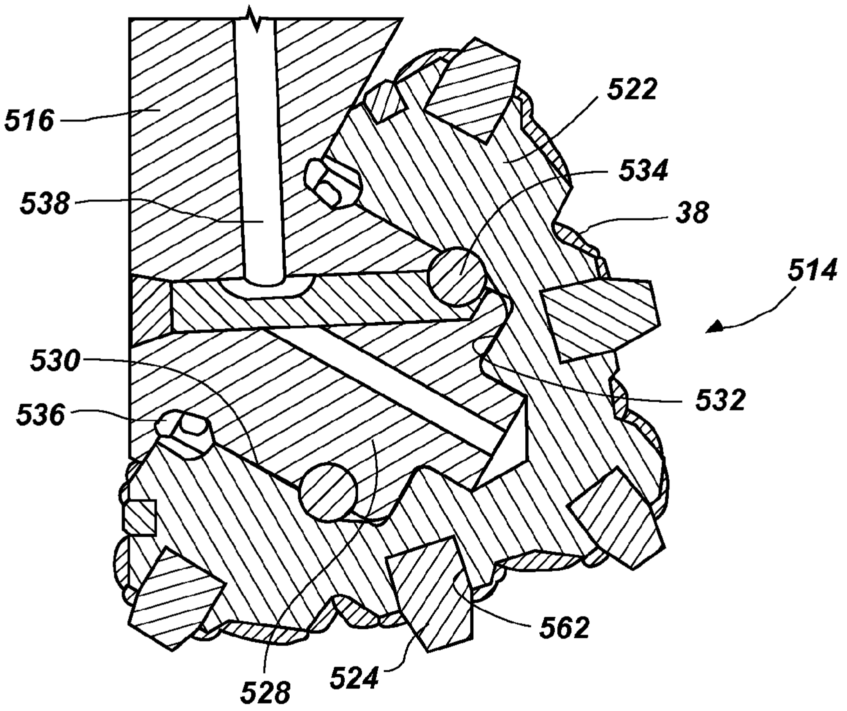
FIG. 26A is a cross-section of the cone illustrated in FIG. 2A having hardfacing thereon.
Figure 26B:
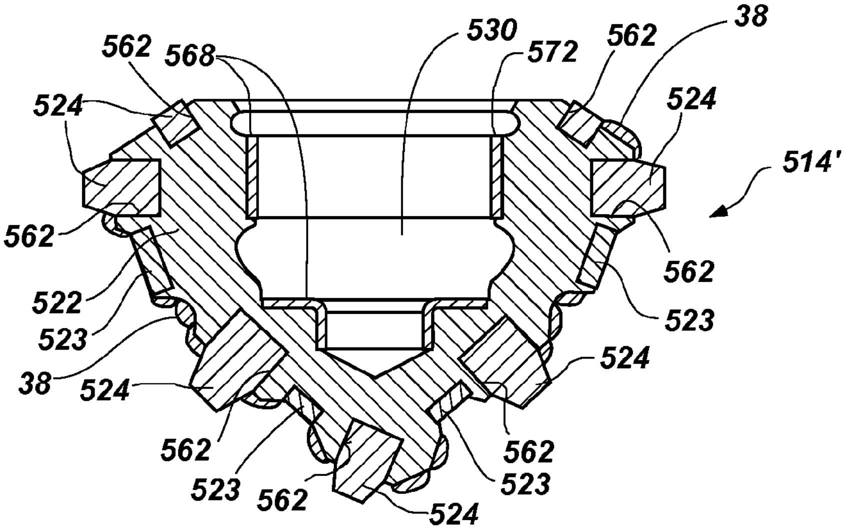
FIG. 26B is a cross-section of the cone illustrated in FIG. 2B having hardfacing thereon.

FIGS. 26A and 26B illustrate hardfacing 38 applied using the systems and methods described herein to the cutter assemblies 514 and cones 522 illustrated in FIG. 2A to provide protection to portions of cones of sintered materials using inserts 524 as teeth or cutters.

Figure 27:
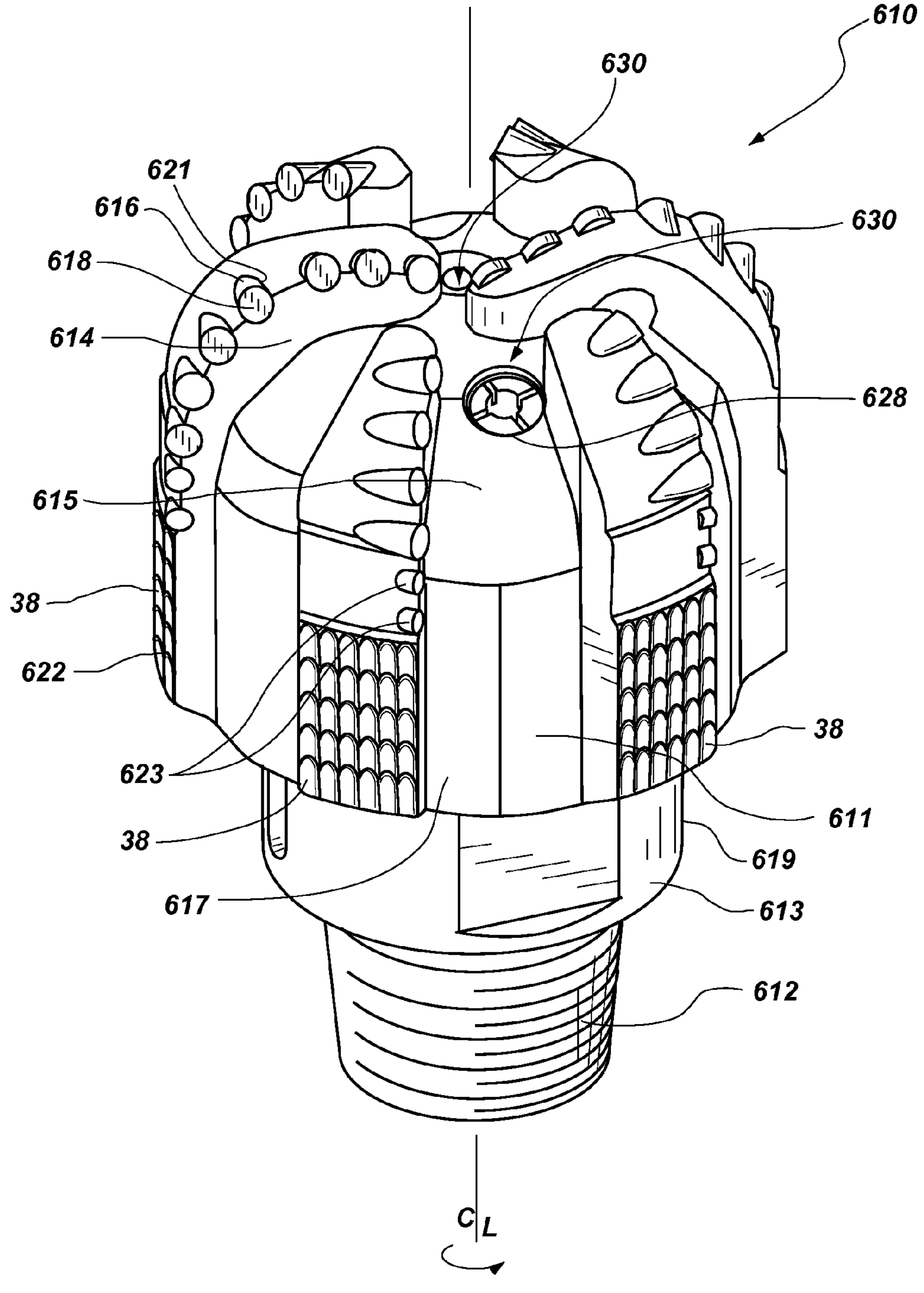
FIG. 27 is a side elevational view of a drag type earth-boring drill bit according to an embodiment of the present invention having hardfacing applied to portions thereof.

FIG. 27 illustrates hardfacing 38 applied using the systems and methods described herein to a drill bit 610, although hardfacing may be applied to any type drill bit or portions thereof as described herein.

It will be readily apparent to those skilled in the art that the general principles defined herein may be applied to other embodiments and applications without departing from the spirit and scope of the present invention.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

What is claimed is:

1. A system for depositing hardfacing material on at least a portion of an earth-boring tool, comprising:

a torch positioner comprising a hardfacing torch movable in at least a first plane and a second, perpendicular plane, the hardfacing torch being configured to deposit hardfacing on at least a portion of an earth-boring tool;

a workpiece positioner comprising a holder configured to support the at least a portion of the earth-boring tool in the holder, the holder being movable in at least a third plane parallel to the second plane;

at least one sensor configured to determine a location of a surface of the at least a portion of the earth-boring tool supported by the workpiece positioner; and a programmable control system operatively connected to the torch positioner, the workpiece positioner, and the at least one sensor, the programmable control system being programmed to cause the torch positioner to oscillate the hardfacing torch in the second plane while selectively causing the workpiece positioner to move the holder in the third plane and causing the torch to deposit hardfacing material on the surface of the at least a portion of the earth-boring tool.

2. The system of claim 1, wherein the torch positioner is movable in an at least substantially horizontal plane, the workpiece positioner is movable in another at least substantially horizontal plane, and the programmable control system is programmed to cause the torch positioner to oscillate the hardfacing torch in the at least substantially horizontal plane while selectively causing the workpiece positioner to move the holder in the other at least substantially horizontal plane.

3. The system of claim 2, wherein the programmable control system is programmed to cause the torch positioner to oscillate the hardfacing torch linearly in the at least substantially horizontal plane along an at least substantially horizontal axis.

4. The system of claim 1, wherein the programmable control system is programmed to define a target path by superimposing a waveform traversing a centerline of the surface of the at least a portion of the earth-boring tool onto a step pattern extending parallel to the centerline of the surface of the at least a portion of the earth-boring tool, to cause the torch positioner to oscillate in the second plane to follow the waveform, and to cause the workpiece positioner to move the holder in the third plane to follow the step pattern.

5. The system of claim 1, further comprising a voltmeter configured to measure a voltage of a transferred arc between the hardfacing torch and the surface of the at least a portion of the earth-boring tool and wherein the programmable control system is programmed to cause the torch positioner to move the torch linearly in the first plane to modulate a distance between the hardfacing torch and the surface of the at least a portion of the earth-boring tool to control a voltage output of the hardfacing torch.

6. The system of claim 5, wherein the programmable control system is programmed to cause the torch positioner to move the torch linearly in the first plane to modulate the distance between the hardfacing torch and the surface of the at least a portion of the earth-boring tool to maintain a voltage output of the hardfacing torch at least substantially constant.

7. The system of claim 1, wherein the programmable control system is programmed to cause the torch positioner to oscillate the hardfacing torch in the second plane at an amplitude of between about 6 mm and about 10 mm.

8. The system of claim 1, wherein the programmable control system is programmed to cause the torch positioner to oscillate the hardfacing torch in the second plane in a generally triangular waveform.

9. The system of claim 8, wherein the programmable control system is programmed to cause the torch positioner to dwell the hardfacing torch at peak amplitudes of the oscillation for between about 0.1 seconds to about 0.4 seconds.

10. The system of claim 1, wherein the programmable control system is programmed to selectively cause the workpiece positioner to move the holder in the third plane at a greater rate of speed than the programmable control system is programmed to cause the torch positioner to oscillate the hardfacing torch in the second plane.

11. The system of claim 1, wherein the hardfacing torch comprises:

a plasma transfer arc torch comprising a nozzle;

a plasma gas supply comprising an electrically controllable flow valve;

a shielding gas supply comprising an electrically controllable flow valve;

a transport gas supply comprising an electrically controllable flow valve; and a powder dosage system connected to the transport gas supply.

12. The system of claim 11, wherein the programmable control system is programmed to maintain an orientation of the plasma transfer arc torch and the powder dosage system at least substantially vertical.

13. The system of claim 1, wherein the holder of the workpiece positioner comprises a jawed chuck.

14. A method of depositing hardfacing material on at least a portion of an earth-boring tool, comprising:

supporting at least a portion of an earth-boring tool in a holder of a workpiece positioner, the holder being movable in at least a third plane;

determining a location of a surface of the at least a portion of the earth-boring tool utilizing at least one sensor; and controlling the workpiece positioner, the at least one sensor, and a torch positioner comprising a hardfacing torch movable in at least a first plane perpendicular to the third plane and a second plane parallel to the third plane utilizing a programmable control system operatively connected to the torch positioner, the workpiece positioner, and the at least one sensor to cause the torch positioner to oscillate the hardfacing torch in the second plane while selectively causing the workpiece positioner to move the holder in the third plane and causing the torch to deposit hardfacing material on the surface of the at least a portion of the earth-boring tool.

15. The method of claim 14, further comprising defining a target path utilizing the programmable control system by superimposing a waveform traversing a centerline of the surface of the at least a portion of the earth-boring tool onto a step pattern extending parallel to the centerline of the surface of the at least a portion of the earth-boring tool, causing the torch positioner to oscillate in the second plane to follow the waveform, and causing the workpiece positioner to move the holder in the third plane to follow the step pattern.

16. The method of claim 14, further comprising measuring a voltage of a transferred arc between the hardfacing torch and the surface of the at least a portion of the earth-boring tool utilizing a voltmeter and causing the torch positioner to move the torch linearly in the first plane utilizing the programmable control system to modulate a distance between the hardfacing torch and the surface of the at least a portion of the earth-boring tool to control a voltage output of the hardfacing torch.

17. The method of claim 16, further comprising causing the torch positioner to move the torch linearly in the first plane utilizing the programmable control system to modulate the distance between the hardfacing torch and the surface of the at least a portion of the earth-boring tool to maintain a voltage output of the hardfacing torch at least substantially constant.

18. The method of claim 14, further comprising causing the torch positioner to dwell the hardfacing torch at peak amplitudes of the oscillation for between about 0.1 seconds to about 0.4 seconds utilizing the programmable control system.

19. The method of claim 14, further comprising causing the workpiece positioner to move the holder in the third plane at a greater rate of speed than the torch positioner is caused to oscillate the hardfacing torch in the second plane utilizing the programmable control system.

20. The method of claim 14, further comprising maintaining an orientation of a plasma transfer arc torch and a powder dosage system connected to a gas supply of the plasma transfer arc torch at least substantially vertical utilizing the programmable control system.

* * * * *